United States Patent
Miura et al.

(10) Patent No.: US 8,972,160 B2
(45) Date of Patent: Mar. 3, 2015

(54) NAVIGATION DEVICE, NAVIGATION METHOD, AND NAVIGATION PROGRAM

(75) Inventors: Naoki Miura, Toyokawa (JP); Junichi Nonomura, Okazaki (JP)

(73) Assignee: Aisin AW Co., Ltd., Aichi-ken (JP)

( * ) Notice: Subject to any disclaimer, the term of this patent is extended or adjusted under 35 U.S.C. 154(b) by 113 days.

(21) Appl. No.: 13/184,083

(22) Filed: Jul. 15, 2011

(65) Prior Publication Data

US 2012/0035843 A1 Feb. 9, 2012

(30) Foreign Application Priority Data

Aug. 6, 2010 (JP) ................................. 2010-177991

(51) Int. Cl.
*G06F 19/00* (2011.01)
*G06G 7/70* (2006.01)
(Continued)

(52) U.S. Cl.
CPC .................................. *G01C 21/3697* (2013.01)
USPC ........... 701/123; 701/104; 701/400; 701/410; 701/424

(58) Field of Classification Search
CPC .... G01C 21/3469; G01C 21/36; G01C 21/00; G01C 17/00; G01C 22/00; G01C 21/34; G01C 21/3484; G01C 21/26; G06F 19/00; G06F 17/5004; G06F 8/64; G06F 8/65; G06F 17/30241; G06F 17/3087; G06F 17/00; G06F 17/30; G06G 7/70; B60W 2510/244; B60W 10/08; B60W 10/06; B60W 10/10
USPC ............... 701/123, 110, 201, 212, 55, 2, 200, 701/416, 29, 533, 21, 410, 3, 38, 103, 29.4, 701/438, 439; 340/441, 439, 458, 450.2, 340/456, 438

See application file for complete search history.

(56) References Cited

U.S. PATENT DOCUMENTS 5,742,922 A * 4/1998 Kim .............................. 701/423
5,913,917 A * 6/1999 Murphy ........................ 701/123

(Continued)

FOREIGN PATENT DOCUMENTS

CN 101322011 A 12/2008
CN 101681561 A 3/2010

(Continued)

OTHER PUBLICATIONS

Japanese Office Action, dated Dec. 17, 2013, issued in corresponding Japanese Patent Application No. 2010-177991.

(Continued)

*Primary Examiner* — Calvin Cheung
*Assistant Examiner* — Luis A Martinez Borrero
(74) *Attorney, Agent, or Firm* — Sughrue Mion, PLLC

(57) ABSTRACT

A navigation device apparatus and method are provided. The apparatus includes a fuel consumption determination unit that determines a fuel consumption during a travel of a vehicle. Also included is a fuel consumption information storage unit that stores point information identifying a departing point and a destination in the travel of the vehicle and fuel consumption information identifying the fuel consumption during a previous travel A display unit is included that acquires previous fuel consumption information identifying the fuel consumption during the previous travel corresponding to the departing point and the destination during a current travel of the vehicle, and controls the display of the fuel consumption during the previous travel based on the acquired previous fuel consumption information and the fuel consumption during the current travel determined by the fuel consumption determination unit.

8 Claims, 19 Drawing Sheets

(51) Int. Cl.
*G06G 7/76* (2006.01)
*G01C 21/36* (2006.01)

(56) References Cited

U.S. PATENT DOCUMENTS

| | | | | |
|---|---|---|---|---|
| 6,208,932 | B1* | 3/2001 | Ohmura et al. | 701/538 |
| 6,845,322 | B1* | 1/2005 | Chao et al. | 701/411 |
| 7,512,486 | B2* | 3/2009 | Needham et al. | 701/414 |
| 7,865,305 | B2* | 1/2011 | Sengoku et al. | 701/416 |
| 7,880,597 | B2* | 2/2011 | Uchida | 340/439 |
| 8,271,196 | B2* | 9/2012 | Jones | 701/533 |
| 8,374,781 | B2* | 2/2013 | Hartman | 701/439 |
| 8,660,787 | B2* | 2/2014 | Minami | 701/400 |
| 8,694,233 | B2* | 4/2014 | Le Brusq et al. | 701/123 |
| 8,798,901 | B2* | 8/2014 | Yasushi et al. | 701/123 |
| 2004/0128064 | A1* | 7/2004 | Lueer et al. | 701/201 |
| 2005/0096836 | A1* | 5/2005 | Minami et al. | 701/123 |
| 2005/0159889 | A1* | 7/2005 | Isaac | 701/210 |
| 2006/0064243 | A1* | 3/2006 | Hirose | 701/211 |
| 2007/0021909 | A1* | 1/2007 | Matsuda | 701/208 |
| 2007/0073468 | A1* | 3/2007 | Tsukamoto et al. | 701/110 |
| 2007/0112475 | A1* | 5/2007 | Koebler et al. | 701/1 |
| 2007/0256481 | A1* | 11/2007 | Nishiyama et al. | 73/113 |
| 2008/0208451 | A1* | 8/2008 | Minami | 701/201 |
| 2008/0270016 | A1 | 10/2008 | Proietty et al. | |
| 2008/0294339 | A1* | 11/2008 | Tauchi et al. | 701/212 |
| 2009/0040033 | A1* | 2/2009 | Uchida | 340/439 |
| 2009/0281715 | A1* | 11/2009 | Paik | 701/123 |
| 2009/0319139 | A1* | 12/2009 | Kondou et al. | 701/55 |
| 2010/0049397 | A1* | 2/2010 | Liu et al. | 701/33 |
| 2010/0088012 | A1* | 4/2010 | O'Sullivan et al. | 701/200 |
| 2010/0179752 | A1* | 7/2010 | Sengoku et al. | 701/201 |
| 2010/0204911 | A1 | 8/2010 | Taguchi | |
| 2010/0250114 | A1* | 9/2010 | Chikamori et al. | 701/201 |
| 2010/0256836 | A1* | 10/2010 | Mudalige | 701/2 |
| 2010/0295670 | A1* | 11/2010 | Sato et al. | 340/458 |
| 2010/0299057 | A1* | 11/2010 | Osafune | 701/200 |
| 2011/0060517 | A1* | 3/2011 | Kono et al. | 701/123 |
| 2011/0133921 | A1* | 6/2011 | Harumoto et al. | 340/439 |
| 2011/0137511 | A1* | 6/2011 | Harumoto et al. | 701/29 |
| 2011/0137512 | A1* | 6/2011 | Harumoto et al. | 701/29 |
| 2011/0160990 | A1* | 6/2011 | Mineta | 701/123 |
| 2011/0196601 | A1* | 8/2011 | Miura et al. | 701/200 |
| 2011/0205044 | A1 | 8/2011 | Enomoto et al. | |
| 2011/0279255 | A1* | 11/2011 | Miyoshi | 340/441 |
| 2012/0004838 | A1* | 1/2012 | Lee et al. | 701/123 |
| 2012/0029803 | A1* | 2/2012 | Yasushi et al. | 701/123 |
| 2012/0158301 | A1* | 6/2012 | Schilling et al. | 701/533 |
| 2013/0158850 | A1* | 6/2013 | Uchida et al. | 701/123 |

FOREIGN PATENT DOCUMENTS

| | | |
|---|---|---|
| EP | 2 629 276 A1 | 8/2013 |
| JP | 2002-225593 A | 8/2002 |
| JP | 2002-350152 A | 12/2002 |
| JP | 2006-3147 A | 1/2006 |
| JP | 2006-78326 A | 3/2006 |
| JP | 2010-078563 A | 4/2010 |
| JP | 2010-83276 A | 4/2010 |
| KR | 1019960014806 B1 | 5/1999 |
| WO | 2010038376 A1 | 4/2010 |
| WO | 2012/050091 A1 | 4/2012 |

OTHER PUBLICATIONS

Extended European Search Report, dated Oct. 4, 2013, issued in counterpart European Patent Application No. 11173027.1.

* cited by examiner

F I G . 1
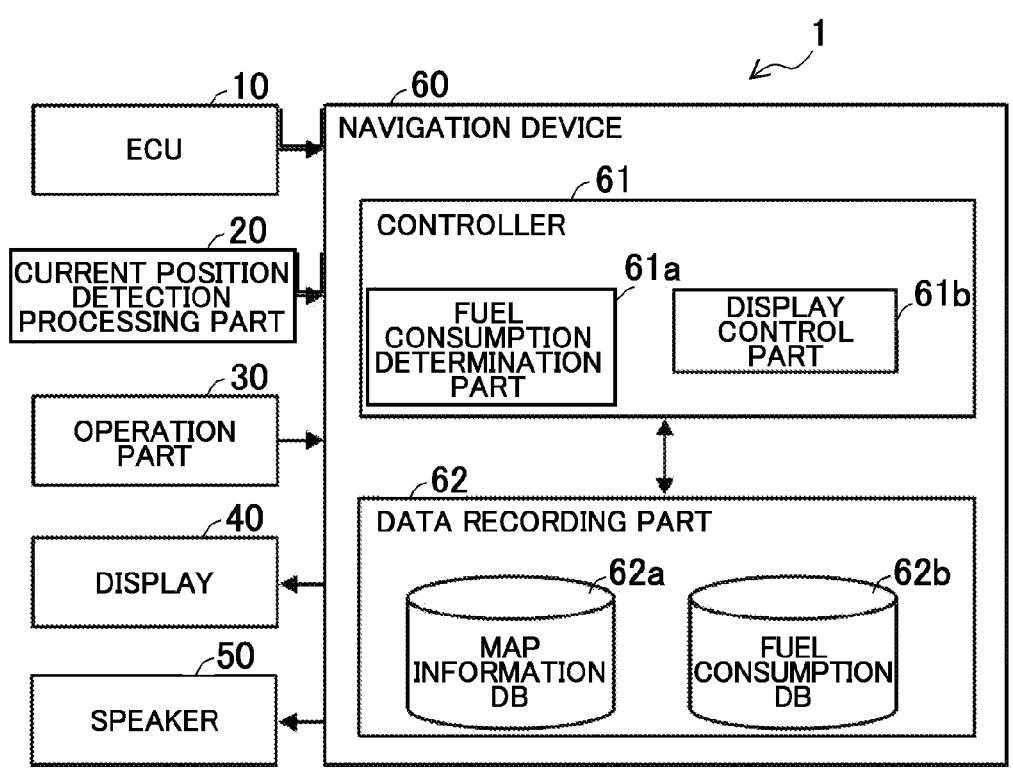

FIG. 2

[FUEL CONSUMPTION DB]

| ROUTE NAME | DEPARTING POINT | | DESTINATION | |
|---|---|---|---|---|
| | NAME | COORDINATE | NAME | COORDINATE |
| HOME–COMPANY | AROUND JUO-CHO, OKAZAKI-SHI, AICHI-KEN | N34.57.22, E137.10.16 | OKAZAKI STATION | N34.55.31, E133.9.26 |
| COMPANY–HOME | OKAZAKI STATION | N34.55.31, E133.9.26 | AROUND JUO-CHO, OKAZAKI-SHI, AICHI-KEN | N34.57.22, E137.10.16 |
| HOME–PARENTS' HOME | AROUND JUO-CHO, OKAZAKI-SHI, AICHI-KEN | N34.57.22, E137.10.16 | AROUND KOGA-CHO, KOGA-SHI, SHIGA-KEN | N34.54.7, E136.12.46 |
| ... | ... | ... | ... | ... |
| PROVISIONAL REGISTRATION | AROUND KITONO, AZA, HANE-CHO, OKAZAKI-SHI | N34.55.48, E137.9.36 | NAGOYA STATION | N35.10.15, E136.52.50 |

| PREVIOUS | | | BEST | | | | AVERAGE FUEL CONSUMPTION | FINAL UPDATED DATE | UPDATED NUMBER |
|---|---|---|---|---|---|---|---|---|---|
| FUEL CONSUMPTION | TRAVEL TIME | TRAVEL DISTANCE | FUEL CONSUMPTION | TRAVEL TIME | TRAVEL DISTANCE | | | | |
| 15.5KM/L | 10MIN. | 16.2KM | 19.5KM/L | 9MIN. | 16.2KM | | 10.0KM/L | 2010/6/22 | 12 |
| 11.2KM/L | 10MIN. | 16.2KM | 17.6KM/L | 9MIN. | 16.2KM | | 9.8KM/L | 2010/6/22 | 11 |
| 15.0KM/L | 107MIN. | 141.1KM | 21.0KM/L | 95MIN. | 141.1KM | | 17.3KM/L | 2010/3/5 | 5 |
| ... | | | ... | | | | ... | ... | ... |
| 17.5KM/L | 62MIN. | 45.6KM | — | — | — | | — | 2010/6/23 | — |

F I G . 10A
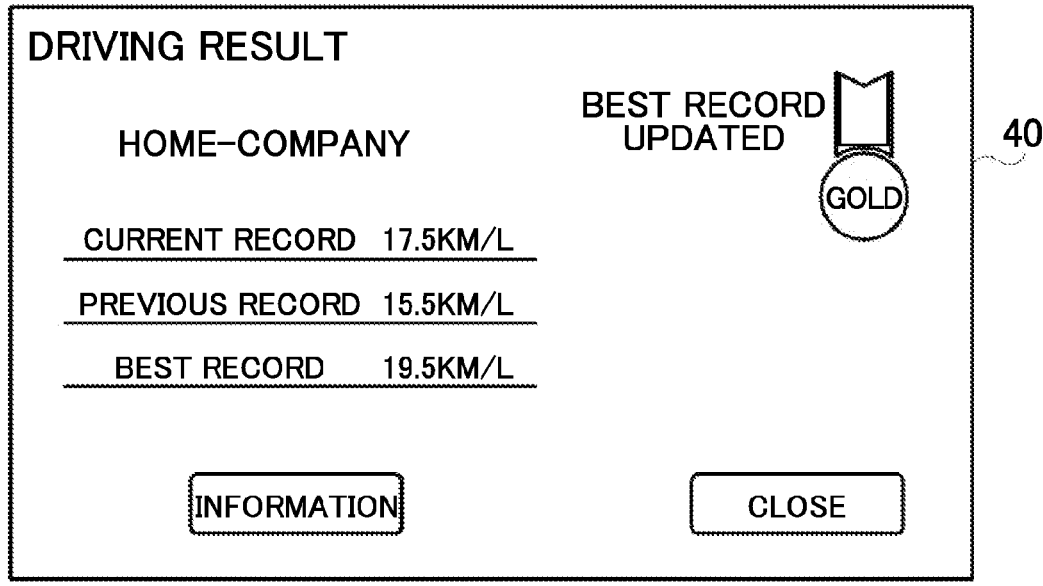
F I G . 10B
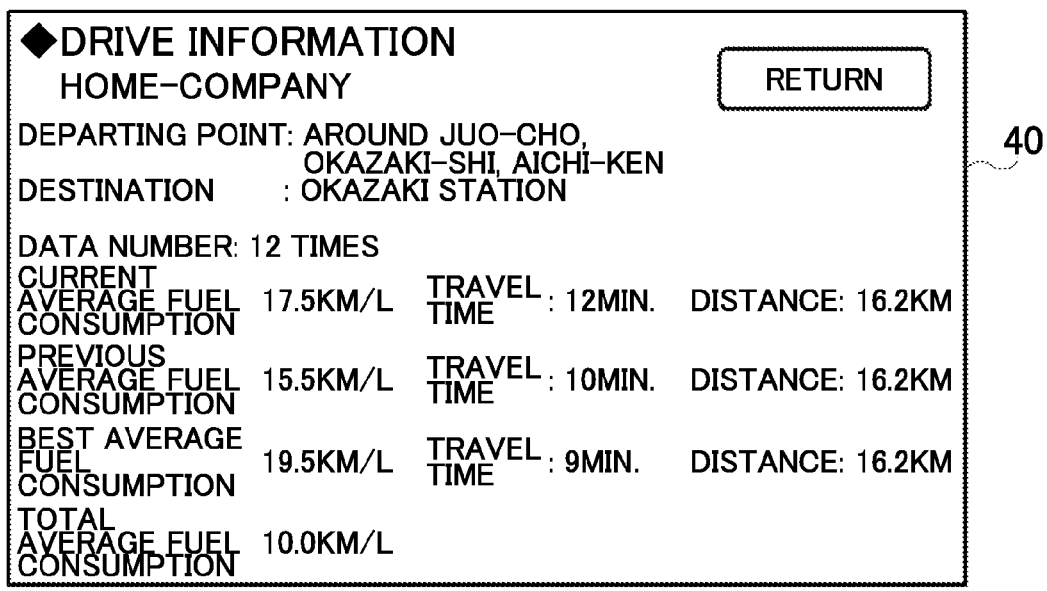

F I G . 11
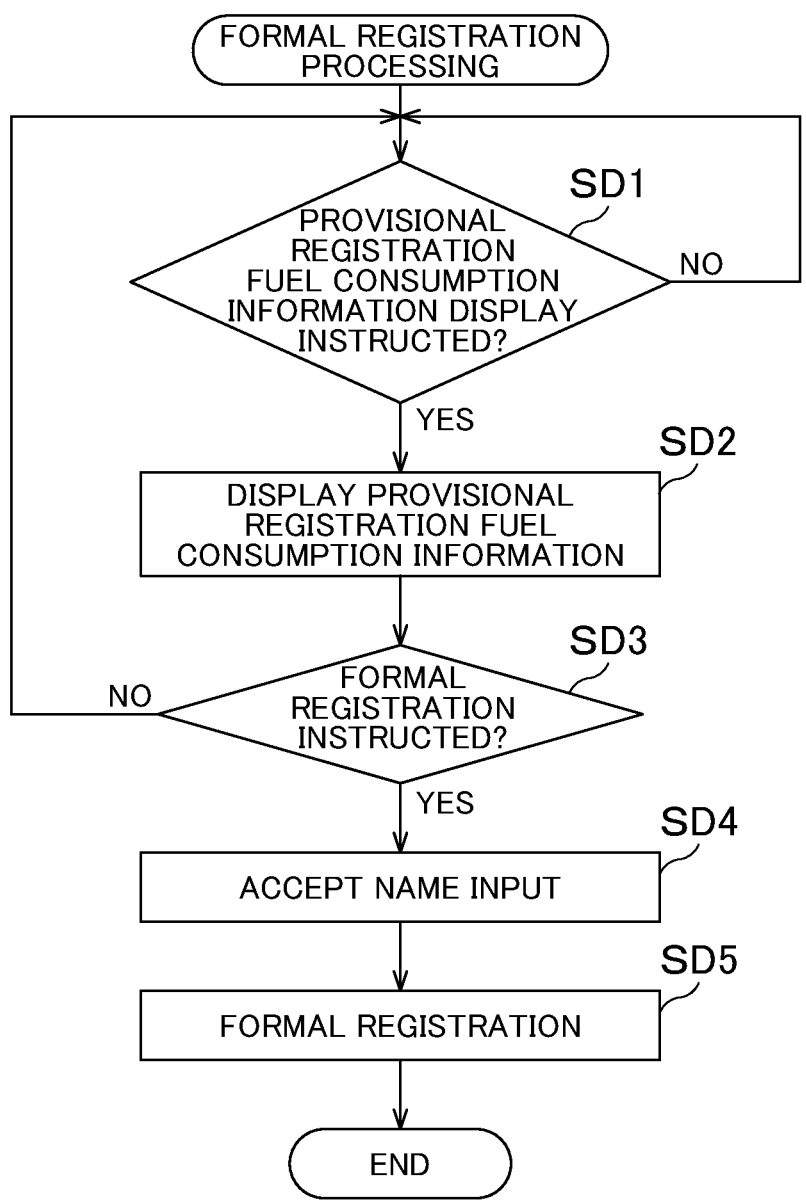

F I G . 12A

```
FUEL CONSUMPTION DB SETTING        ⤺ RETURN

DESCRIPTION                                              40

┌─────────────────────────┐
            │    FORMAL REGISTRATION  │
            └─────────────────────────┘

┌─────────────────────────┐
            │       INFORMATION       │
            └─────────────────────────┘

┌─────────────────────────┐
            │         DELETE          │
            └─────────────────────────┘
```

F I G . 12B

```
PROVISIONAL REGISTRATION FUEL
CONSUMPTION INFORMATION

DEPARTING   : AROUND KITONO,                             40
POINT         AZA, HANE-CHO, OKAZAKI-SHI

DESTINATION: NAGOYA STATION
AVERAGE FUEL  17.5KM/L   TRAVELED   2010.06.23
CONSUMPTION              DATE

DO YOU FORMALLY-REGISTER IN
       FUEL CONSUMPTION DB?

┌────────┐           ┌────────┐
      │  YES   │           │   NO   │
      └────────┘           └────────┘
```

F I G . 13
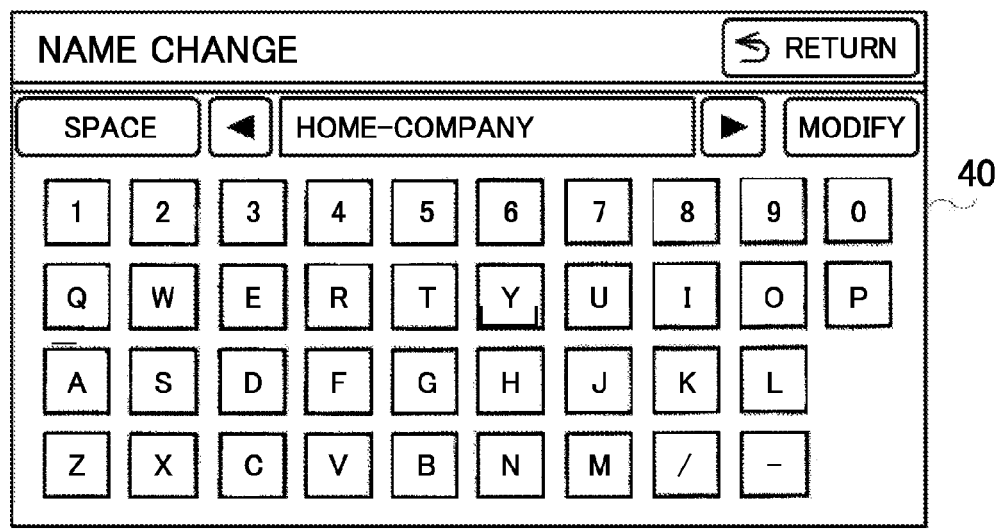

F I G . 15
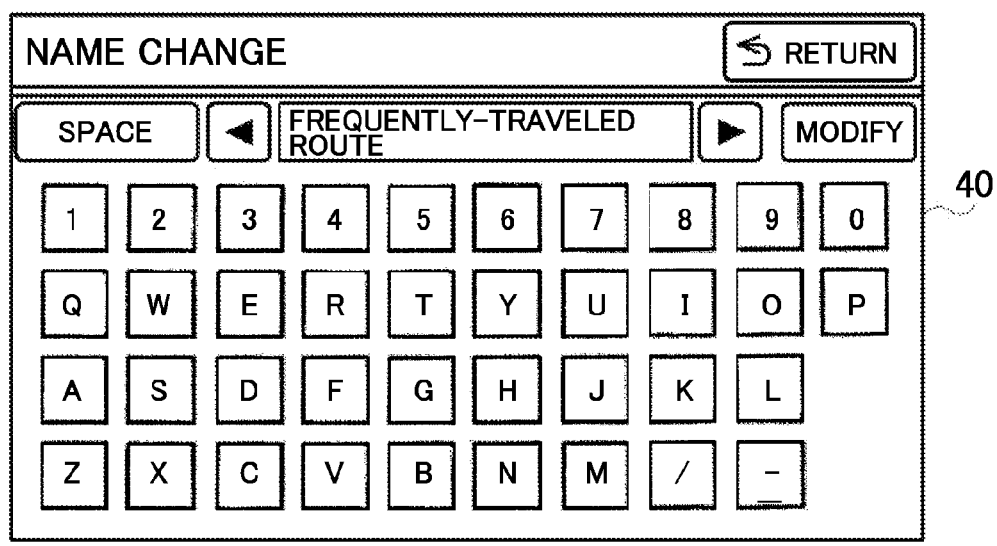

FIG. 18A

[FUEL CONSUMPTION DB]

| ROUTE NAME | DEPARTING POINT | | WAYPOINT | |
|---|---|---|---|---|
| | NAME | COORDINATE | NAME | COORDINATE |
| HOME-COMPANY | AROUND JUO-CHO, OKAZAKI-SHI, AICHI-KEN | N34.57.22, E137.10.16 | IN FRONT OF OKAZAKI POLICE STATION | N34.56.27, E137.9.44 |
| COMPANY-HOME | OKAZAKI STATION | N34.55.31, E133.9.26 | IN FRONT OF OKAZAKI POLICE STATION | N34.56.27, E137.9.44 |
| HOME-PARENTS' HOME | AROUND JUO-CHO, OKAZAKI-SHI, AICHI-KEN | N34.57.22, E137.10.16 | YOKKAICHI JCT | N35.2.13, E136.37.42 |
| ... | ... | ... | ... | ... |
| PROVISIONAL REGISTRATION | AROUND KITONO, AZA, HANE-CHO, OKAZAKI-SHI | N34.55.48, E137.9.36 | NAGOYA-MINAMI JCT | N35.2.58, E136.56.41 |

| DESTINATION | | FUEL CONSUMPTION | PREVIOUS SECTIONAL FUEL CONSUMPTION | | TRAVEL TIME | TRAVEL DISTANCE |
|---|---|---|---|---|---|---|
| NAME | COORDINATE | | SECTION 1 | SECTION 2 | | |
| OKAZAKI STATION | N34.55.31, E133.9.26 | 15.5KM/L | 16.2KM/L | 15.1KM/L | 10MIN. | 16.2KM |
| AROUND JUO-CHO, OKAZAKI-SHI, AICHI-KEN | N34.57.22, E137.10.16 | 11.2KM/L | 11.3KM/L | 11.1KM/L | 10MIN. | 16.2KM |
| AROUND KOGA-CHO, KOGA-SHI, SHIGA-KEN | N34.54.7, E136.12.46 | 15.0KM/L | 17.7KM/L | 12.3KM/L | 107MIN. | 141.1KM |
| ... | ... | ... | ... | ... | ... | ... |
| NAGOYA STATION | N35.10.15, E136.52.50 | 17.5KM/L | 18.1KM/L | 16.7KM/L | 62MIN. | 45.6KM |

(1)

NAVIGATION DEVICE, NAVIGATION METHOD, AND NAVIGATION PROGRAM

INCORPORATION BY REFERENCE

This application claims priority from Japanese Patent Application No. 2010-177991 filed on Aug. 6, 2010, including the specification, drawings and abstract thereof, the disclosure of which is incorporated herein by reference in its entirety.

BACKGROUND OF THE INVENTION

1. Field of the Invention

Aspects of the present invention relate to a navigation device, a navigation method, and a navigation program.

2. Description of the Related Art

In the related art, navigation devices that provide guidance on a travel route of a vehicle are utilized. In recent years, in view of rising fuel costs and environmental conservation, fuel-efficient driving is increasingly desired. Thereby, navigation devices that provide guidance to reduce fuel consumption during a vehicles' travel are being proposed.

For example, car navigation devices that provide information relating to an expected fuel amount to be consumed for each travel route from a designated departing point to an arrival point are being proposed. The car navigation devices create travel data including a travel route and a consumed fuel amount for each vehicle's travel and accumulate the data. If a user designates a start point and an arrival point of the travel route, the car navigation devices select travel routes having a start point and an arrival point that are almost the same as the designated start point and arrival point, and display information based on the consumed fuel amount for each of the selected travel routes using each piece of the above travel data. In addition, the navigation devices accept a designation of one of the selected travel routes and provide guidance on the designated travel route (for example, refer to Japanese Patent Application; Publication No. JP-A-2010-78563.)

SUMMARY OF THE INVENTION

However, these related art devices as mentioned above, only provide guidance on the travel route designated by the user after displaying the information based on the consumed fuel amount. That is, the devices mentioned above only enable the user to select a travel route based on the displayed consumed fuel amount, but they do not provide guidance that could motivate the user driving along the selected travel route to conduct further fuel-efficient driving. Consequently, the user was not able to compare, for example, the current fuel consumption with the fuel consumption in the past. In addition, the devices as mentioned above, every time the vehicle travels, sequentially accumulate the travel data and display the information based on the consumed fuel amount using all the accumulated travel data. Therefore, the information, in which the past travel data when the user was conducting fuel-inefficient driving due to poor driving skill is reflected, is also displayed. That is, there are cases where the displayed information is not useful for the user because it displays poor or inefficient driving conditions.

In view of the above-mentioned problems, it is an aspect of the present invention to provide a navigation device, a navigation method, and a navigation program that are able to provide guidance that could motivate the user to conduct further fuel-efficient driving and provide information useful for the current user.

To solve the aforementioned problem and achieve this aspect, a navigation device in a first aspect of the present invention includes: a fuel consumption determination unit that determines a fuel consumption during a travel of a vehicle; a fuel consumption information storage unit that stores point information identifying a departing point and a destination in the travel of the vehicle and fuel consumption information identifying a fuel consumption during previous travel from the departing point to the destination such that the point information and the fuel consumption information are mutually associated; and a display control unit that acquires previous fuel consumption information identifying the fuel consumption during the previous travel among the fuel consumption information associated with the point information corresponding to the departing point and the destination during a current travel of the vehicle from the fuel consumption information storage unit, and controls a display of the fuel consumption during the previous travel based on the acquired previous fuel consumption information and the fuel consumption during the current travel determined by the fuel consumption determination unit.

According to the navigation device in a second aspect of the present invention, in the navigation device according to the first aspect of the present invention, the display control unit acquires best fuel consumption information identifying a most efficient fuel consumption among the fuel consumption information associated with the point information corresponding to the current travel departing point and destination of the vehicle from the fuel consumption information storage unit, and controls a display of the most efficient fuel consumption based on the acquired best fuel consumption information.

According to the navigation device in a third aspect of the present invention, in the navigation device according to the second aspect of the present invention, the display control unit, after the vehicle has arrived at the destination, controls a display of an evaluated result of the fuel consumption in the current travel on the basis of a comparison among the fuel consumption in the previous travel based on the acquired previous fuel consumption information, the most efficient fuel consumption based on the acquired best fuel consumption information, and the fuel consumption in the current travel determined by the fuel consumption determination unit.

According to the navigation device in a fourth aspect of the present invention, in the navigation device according to any one of the first to the third aspects of the present invention, the display control unit acquires average fuel consumption information identifying an average fuel consumption in the past travel among the fuel consumption information associated with the point information corresponding to the departing point and the current travel destination of the vehicle from the fuel consumption information storage unit, and controls a display of the average fuel consumption based on the acquired average fuel consumption information.

According to the navigation device in a fifth aspect of the present invention, in the navigation device according to the fourth aspect of the present invention, the display control unit, after the vehicle has arrived at the destination, controls a display of an evaluated result of the fuel consumption in the current travel on the basis of a comparison among the fuel consumption in the previous travel based on the acquired previous fuel consumption information, the average fuel consumption based on the acquired average fuel consumption information, and the fuel consumption in the current travel determined by the fuel consumption determination unit.

According to the navigation device in a sixth aspect of the present invention, in the navigation device according to any one of the first to fifth aspects of the present invention, the fuel consumption information storage unit further stores travel route information identifying an attribute of a travel route from the departing point to the destination, and the display control unit acquires the previous fuel consumption information associated with the travel route information corresponding to the attribute of a current travel route of the vehicle from the fuel consumption information storage unit, and controls a display of the fuel consumption in the previous travel based on the acquired previous fuel consumption information and the fuel consumption in the current travel determined by the fuel consumption determination unit.

A navigation method in a seventh aspect of the present invention includes the steps of: determining a fuel consumption in a travel of a vehicle; storing, in a recording unit, point information identifying a departing point and a destination in the travel of the vehicle and fuel consumption information identifying the fuel consumption in a past travel from the departing point to the destination such that the point information and the fuel consumption information is mutually associated; and acquiring previous fuel consumption information identifying the fuel consumption in a previous travel among the fuel consumption information associated with the point information corresponding to the departing point and the destination in a current travel of the vehicle from the recording unit, and controlling a display of the fuel consumption in the previous travel based on the acquired previous fuel consumption information and the fuel consumption in the current travel determined at the fuel consumption determination step.

A navigation program in an eighth aspect of the present invention causes a computer to execute the method of the seventh aspect of the present invention.

According to the navigation device in the first aspect of the present invention, the navigation method in the seventh aspect of the present invention, and the navigation program in the eighth aspect of the present invention, a display of the fuel consumption in the previous travel based on the previous fuel consumption information and the fuel consumption in the current travel determined by the fuel consumption determination unit are controlled. Therefore, it is possible to provide guidance that enables the user to compare the fuel consumption in the current travel with the fuel consumption in the previous travel while driving, for example. In such a manner, for example, instead of the best fuel consumption that was achieved in the past because of numerous favorable conditions different from the conditions in the current travel, the fuel consumption in the previous travel that is similar in travel conditions to the current travel is displayed together with the fuel consumption in the current travel. Thereby, it is possible to provide the user with a target that is achievable in the current travel, which makes it possible to provide the guidance that further motivate the user to conduct fuel-efficient driving. In addition, without managing the fuel consumption information for each travel condition such as a season, a time period, or weather, it is possible to provide the user with the fuel consumption in the travel conditions that are similar to the current travel through displaying the fuel consumption in the previous travel. Therefore, it becomes possible to provide the guidance that could further motivate the user to conduct fuel-efficient driving without increasing a storage capacity to manage the fuel consumption information. In addition, the fuel consumption in the previous travel that is highly likely similar in conditions to the current travel is displayed together with the fuel consumption in the current travel. Therefore, the guidance on the information especially useful for the current driver can be provided.

According to the navigation device in the second aspect of the present invention, a display of the most efficient fuel consumption based on the best fuel consumption information associated with the point information corresponding to the departing point and the current travel destination of the vehicle is controlled. Therefore, it is possible to provide the guidance that enables the user to compare the fuel consumption in the current travel with the fuel consumption in the most efficient fuel consumption in the past, for example. Thereby, it is possible to provide the guidance that could motivate the user to conduct further fuel-efficient driving, for example, such that the best record of the fuel consumption could be broken in the current travel.

According to the navigation device in the third aspect of the present invention, after the vehicle has arrived at the destination, a display of an evaluated result of the fuel consumption in the current travel on the basis of a comparison among the fuel consumption in the previous travel based on the previous fuel consumption information, the most efficient fuel consumption based on the best fuel consumption information, and the fuel consumption in the current travel determined by the fuel consumption determination unit is controlled. Therefore, if the fuel consumption in the current travel has exceeded the most efficient fuel consumption in the past, by assigning a higher level to the driving of the user for example, it is possible to provide the guidance that could motivate the user to conduct further fuel-efficient driving in the future.

According to the navigation device in the fourth aspect of the present invention, a display of the average fuel consumption based on the average fuel consumption information that is associated with the point information corresponding to the departing point and the current travel destination of the vehicle is controlled. Therefore, it is possible to provide the guidance that enables the user to compare the fuel consumption in the current travel with the average fuel consumption in the past while driving, for example. Thereby, it is possible to provide the guidance that could motivate the user to conduct further fuel-efficient driving, for example, such that the fuel consumption in the current travel would not fall below at least the average fuel consumption in the past in the current travel.

According to the navigation device in the fifth aspect of the present invention, after the vehicle has arrived at the destination, a display of an evaluated result of the fuel consumption in the current travel on the basis of a comparison among the fuel consumption in the previous travel based on the previous fuel consumption information, the average fuel consumption based on the average fuel consumption information, and the fuel consumption in the current travel determined by the fuel consumption determination unit is controlled. Therefore, if the fuel consumption in the current travel has fallen below the average fuel consumption in the past, by assigning a lower level toward the driving of the user for example, it is possible to provide the guidance that could motivate the user to conduct further fuel-efficient driving in the future.

According to the navigation device in the sixth aspect of the present invention, the previous fuel consumption information associated with the travel route information corresponding to the attribute of the current travel route of the vehicle is acquired from the fuel consumption information storage unit, and a display of the fuel consumption in the previous travel based on the acquired previous fuel consumption information and the fuel consumption in the current travel determined by the fuel consumption determination unit is controlled. Therefore, it is possible to acquire the fuel consumption information appropriate as a target for comparison with the fuel consumption in the current travel of the vehicle from the fuel consumption information storage unit and control the display. Thereby, it is possible to provide information useful for the user.

BRIEF DESCRIPTION OF THE DRAWINGS

FIG. 1 is a block diagram illustrating a navigation system according to a first embodiment.

FIG. 2 is a table illustrating information stored in a fuel consumption DB.

FIG. 10 illustrates the display in which an evaluated result of the fuel consumption in the current travel is displayed.

FIG. 11 is a flow chart of formal registration processing.

FIG. 12 illustrates a screen displayed on the display when formally-registering fuel consumption information that was provisionally-registered in the fuel consumption DB.

FIG. 13 illustrates a screen to be displayed on the display when formally-registering fuel consumption information that was provisionally-registered in the fuel consumption DB.

FIG. 15 illustrates a screen to be displayed on the display when editing information that was formally-registered in the fuel consumption DB.

DETAILED DESCRIPTION OF THE EXEMPLARY EMBODIMENTS

Figure 3:
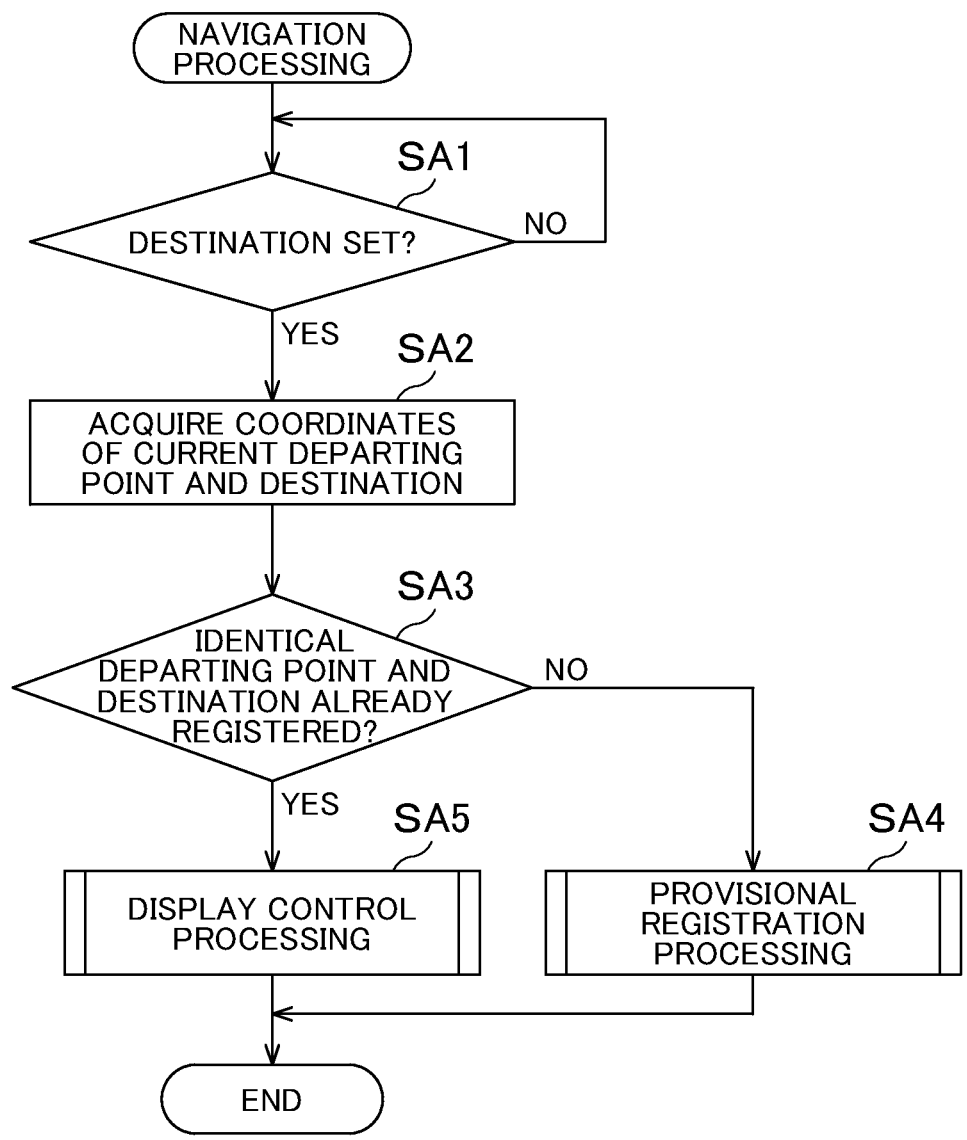
FIG. 3 is a flow chart of navigation processing.

A navigation device, a navigation method, and a navigation program according to the present invention are described in further detail below with reference to embodiments in conjunction with the accompanying drawings. However, the present invention is not limited to the respective embodiments.

[First Embodiment]

The navigation device according to a first embodiment is explained. In the first embodiment, a display of a fuel consumption in a previous travel and a fuel consumption in a current travel from a departing point to a destination is controlled.

(Configuration)

First, a configuration of the navigation device according to the first embodiment is explained. FIG. 1 is a block diagram illustrating a navigation system according the first embodiment. A navigation system 1 is mounted in a vehicle and provided with an ECU (Electronic Control Unit) 10, a current position detection processing part 20, an operation part 30, a display 40, a speaker 50, and a navigation device 60, as shown in FIG. 1.

(Configuration—ECU)

The ECU 10 monitors the status of respective parts of the vehicle through various kinds of sensors, and controls the respective parts of the vehicle such as a power system like an engine and a motor generator of the vehicle (not shown), a transmission (not shown), a drive system (not shown), a braking system (not shown), and the like. For example, the ECU 10 controls the transmission by acquiring a vehicle speed pulse signal proportional to the rotating number of a wheel from a vehicle speed sensor, and controls a fuel injection device (not shown) based on a level of oxygen in the exhaust as acquired from an O2 sensor. Various information, such as the vehicle pulse signal, a fuel injection amount, and the like, is input from the ECU 10 to the navigation device 60.

(Configuration—Current Position Detection Processing Part)

The current position detection processing part 20 is a current position detection unit for detecting a current position of a vehicle mounted with the navigation system 1. Specifically, the current position detection processing part 20 includes at least one of a GPS (not shown), a geomagnetic sensor (not shown), a distance sensor (not shown), and a gyro sensor (not shown), and detects a current vehicle position (a coordinate), an orientation, and the like in a known method.

(Configuration—Operation Part)

The operation part 30 is an operation unit for receiving an input operated by a user. The operation part 30 is not limited to any specific configuration. For example, the operation part 30 can include a touch panel provided on a front side of the display 40, a pressing button, a remote operation unit such as a remote controller, or a voice recognition unit such as a microphone that accepts an audio input.

(Configuration—Display)

The display 40 is an output unit for performing a display output of various kinds of information based on the control of the navigation device 60. The display 40 is not limited to a specific configuration, and can be provided with a known liquid crystal display or a flat panel display such as an organic EL display.

(Configuration—Speaker)

The speaker 50 is an output unit for outputting various kinds of audio based on the control of the navigation device 60. The audio outputted by the speaker 50 is not limited to a specific manner. The audio can be a synthetic audio generated as needed or a previously recorded audio.

(Configuration—Navigation Device)

The navigation device 60 is provided with a controller 61 and a data recording part 62.

(Configuration—Navigation Device-Controller)

The controller 61 is a control unit for controlling the navigation device 60, specifically a computer including a CPU, various kinds of programs recognized and executed on the CPU (including a basic control program such as OS and an application program to be activated on the OS and realize specific functions), and an internal memory such as a RAM for storing the programs and various kinds of data. Particularly, a navigation program according to the first embodiment may be substantially installed in the navigation device 60 through an arbitrary recording medium or a network to form respective parts of the controller 61.

The controller 61 is, in terms of a functional concept, provided with a fuel consumption determination part 61a and a display control part 61*b*. The fuel consumption determination part 61*a* is a fuel consumption determination unit for identifying a fuel consumption during the travel of a vehicle. The display control part 61*b* is a display control unit for controlling a display on the display 40. The processing executed by the respective parts of the controller 61 will be described in detail later.

(Configuration—Navigation Device—Data Recording Part)

The data recording part 62 is a recording unit for recording programs and various kinds of data necessary for the operation of the navigation device 60. For example, the data recording part 62 is provided with a hard disk (not shown) as an external storage device. However, in place of or in combination with the hard disk, other storage medium including a magnetic storage medium such as a magnetic disk or an optical storage medium such as a DVD and a Blu-ray disk can be utilized.

The data recording part 62 is provided with a map information database 62*a* (hereinafter referred to as DB) and a fuel consumption DB 62*b*.

The map information DB 62*a* is a map information storage unit for storing map information. The "map information" includes for example link data (link numbers, connecting node numbers, road coordinates, road attributes, the number of lanes, driving regulation, and the like), node data (node numbers, coordinates), feature data (traffic lights, traffic signs, guardrails, buildings, and the like), facility data (positions of facilities, types of facilities, and the like), geographic data, map display data for displaying a map on the display 40, and the like.

The fuel consumption DB 62*b* is a fuel consumption information storage unit for storing fuel consumption information identifying a fuel consumption during past travel. FIG. 2 is a table illustrating information stored in the fuel consumption DB 62*b*. As shown in FIG. 2, the fuel consumption DB 62*b* stores the information corresponding to items "route name", "departing point", "destination", "previous", "best", "average fuel consumption", "final updated date", and "updated number" so as to be associated each other. The information identifying a name of a travel route from a departing point to a destination is stored corresponding to the item "route name" (for example, "home-company" in FIG. 2). Point information identifying the departing point of the travel route is stored corresponding to the item "departing point". The information identifying the name of the departing point is stored corresponding a sub-item "name" (for example, "Around Juo-cho, Okazaki-shi, Aichi-ken" in FIG. 2), and a coordinate identifying the position of the departing point is stored corresponding to a sub-item "coordinate" (for example, "N34. 57. 22, E137. 10. 16" in FIG. 2). Point information identifying the destination of the travel route is stored corresponding to the item "destination". The information identifying the name of the destination is stored corresponding to the sub-item "name" (for example, "Okazaki station" in FIG. 2), and a coordinate identifying the position of the destination is stored corresponding to the sub-item "coordinate" (for example, "N34. 55. 31, E133. 9. 26" in FIG. 2). The information regarding the previous travel from the departing point to the destination is stored corresponding to the item "previous". The fuel consumption information identifying the fuel consumption during the previous travel is stored corresponding to a sub-item "fuel consumption" (for example "15.5 km/L" in FIG. 2), the information identifying a travel time during the previous travel is stored corresponding to a sub-item "travel time" (for example "10 min" in FIG. 2), and the information identifying a travel distance in the previous travel is stored corresponding to a sub-item "travel distance" (for example, "16.2 km" in FIG. 2). The information regarding a travel with the most efficient fuel consumption during the past travel from the departing point to the destination is stored corresponding to the item "best". The fuel consumption information identifying the fuel consumption during the same travel is stored corresponding to the sub-item "fuel consumption" (for example, "19.5 km/L" in FIG. 2), the information identifying the travel time during the same travel is stored corresponding to the sub-item "travel time" (for example, "9 min" in FIG. 2), and the information identifying the travel distance during the same travel is stored corresponding to the sub-item "travel distance" (for example, "16.2 km" in FIG. 2). The fuel consumption information identifying an average fuel consumption during the past travel is stored corresponding to the item "average fuel consumption" (for example, "10.0 km/L" in FIG. 2). The information identifying an updated date of the information associated with each combination of the departing point and the destination is stored corresponding to the item "final updated date" (for example, "2010/6/22" in FIG. 2). The information identifying the number of times the information associated with each combination of the departing point and the destination was updated is stored corresponding to the item "updated number" (for example, "12" in FIG. 2). In the explanation, among the information stored corresponding to the respective items of the fuel consumption DB 62*b* and associated each other, the information for which the information corresponding to the item "route name" is "provisional registration" (the information in the lowest line in FIG. 2) is assumed as being provisionally-registered in the fuel consumption DB 62*b*, and the other pieces of information (the information other than the information in the lowest line in FIG. 2) is assumed as being formally-registered in the fuel consumption DB 62*b*. In addition, the timing when these pieces of information are stored or updated in the fuel consumption DB 62*b* will be explained in detail later along with the explanation of the processing executed by the navigation system 1.

(Processing—Navigation Processing)

Next, navigation processing executed by the navigation system 1 having a configuration described above is explained. FIG. 3 is a flow chart of the navigation processing ("Step" will be referred to as "S" in the following explanation for each part of the process). The navigation processing is executed, for example, when the navigation system 1 is powered and a destination setting screen for route guidance is displayed based on an operation input through the operation part 30.

When the navigation processing starts, the display control part 61*b* waits until a travel destination of the vehicle is set by an operation input through the operation part 30 (SA1: NO). The "destination setting" here includes, in addition to a case where a final destination is set by an operation input through the operation part 30, a case where the order of a plurality of destinations already set is rearranged by an operation input through the operation part 30 and a different destination is set as the final destination, a case where the final destination already set is deleted and another destination is set as the final destination, and the like.

When a travel destination of the vehicle is set by an operation input through the operation part 30 (SA1: YES), the display control part 61*b* acquires coordinates of the current departing point and destination as the point information identifying the departing point and the current travel destination of the vehicle (SA2). For example, the display control part 61*b* acquires, as the coordinate of the departing point, the coordinate of the current position of the vehicle from the current position detection processing part 20, and as the coordinate of the destination, the coordinate corresponding to the destination that is set, for example, through the operation part 30 on the map displayed on the display 40 from the map information DB 62a. When an intermediate destination (a waypoint) is set in addition to the final destination, the display control part 61b acquires the coordinate corresponding to the final destination from the map information DB 62a.

Next, the display control part 61b determines whether a departing point and a destination that are identical to the current departing point and destination are already registered in the fuel consumption DB 62b (SA3). Specifically, the display control part 61b determines that a departing point and a destination that are identical to the current departing point and destination are already registered in the fuel consumption DB 62b if a coordinate within a predetermined distance (for example, 300 m) from the coordinate of the current departing point acquired at SA2 is stored corresponding to the sub-item "coordinate" of the item "departing point" of the fuel consumption DB 62b and a coordinate within a predetermined distance (for example, 300 m) from the coordinate of the current destination acquired at SA2 is stored corresponding to the sub-item "coordinate" of the item "destination" of the fuel consumption DB 62b.

As a result, if the display control part 61b determines that a departing point and a destination that are identical to the current departing point and destination are not registered in the fuel consumption DB 62b (SA3: NO), the display control part 61b executes provisional registration processing (SA4), and terminates the navigation processing. On the other hand, if the display control part 61b determines that a departing point and a destination that are identical to the current departing point and destination are already registered in the fuel consumption DB 62b (SA3: YES), the display control part 61b executes display control processing (SA5), and terminates the navigation processing. Hereinafter, the provisional registration processing and the display control processing are explained.

(Processing—Provisional Registration Processing)

Figure 4:
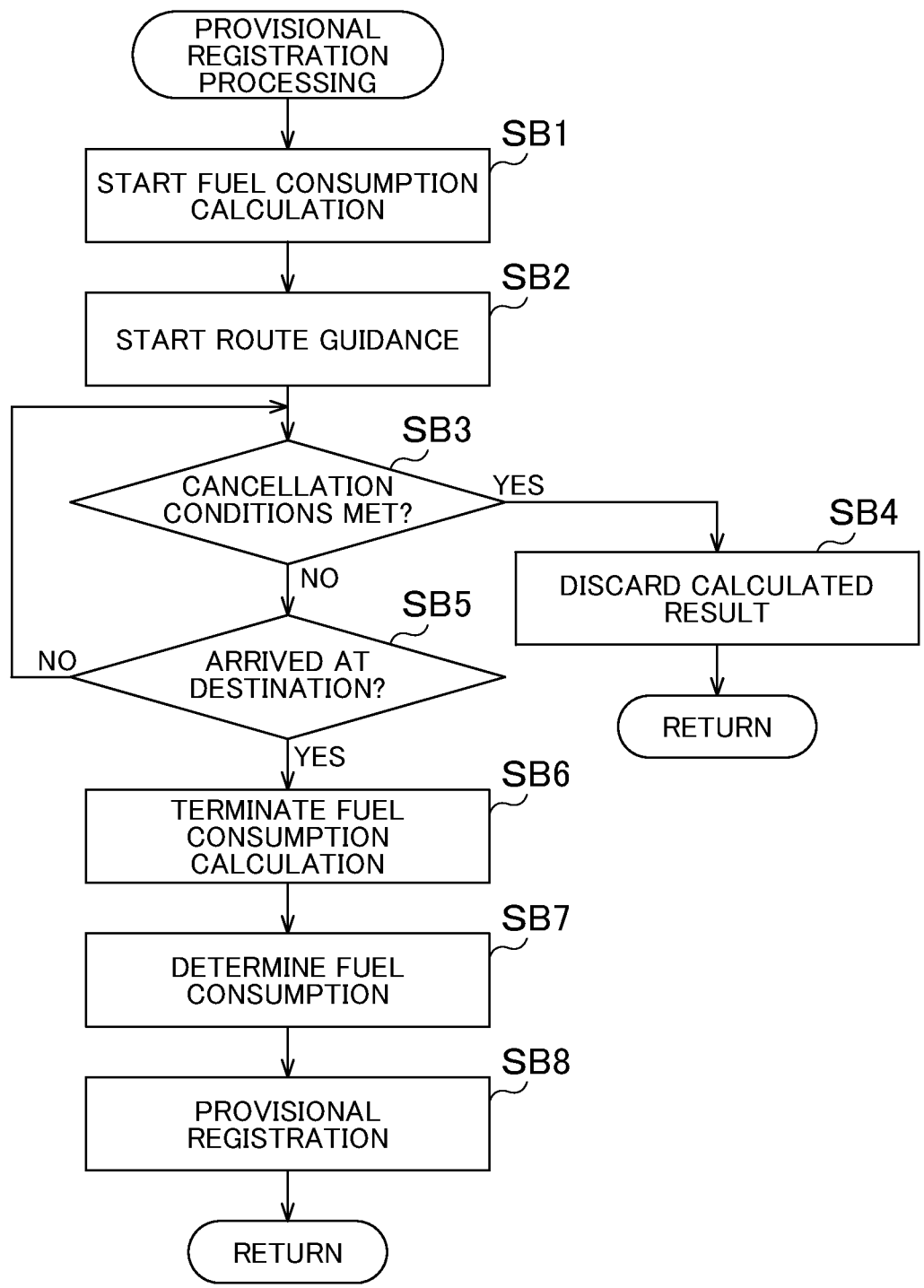
FIG. 4 is a flow chart of provisional registration processing.

The provisional registration processing is the processing for provisionally-registering the fuel consumption information in the fuel consumption DB 62b. FIG. 4 is a flow chart of the provisional registration processing. When the provisional registration processing starts, the fuel consumption determination part 61a starts a calculation of the fuel consumption during the travel of the vehicle (SB1). Specifically, the fuel consumption determination part 61a calculates a travel distance and a consumed fuel amount of the vehicle from when starting the departing point to a time point of the calculation, and calculates the fuel consumption from when starting the departing point to the time point of the calculation by dividing the calculated travel distance by the calculated consumed fuel amount. For example, the fuel consumption determination part 61a calculates, as the travel distance from the departing point of the vehicle, the value acquired by multiplying the number of vehicle speed pulses input through the ECU 10 after the destination has been set at SA1 of FIG. 3 by the travel distance of the vehicle per vehicle speed pulse. In addition, for example, the fuel consumption determination part 61a calculates, as the consumed fuel amount from the departing point, the value acquired by accumulating fuel injection amounts input through the ECU 10 after the destination has been set at SA1 of FIG. 3. Or, the travel distance and the consumed fuel amount calculated based on the number of vehicle speed pulses and the fuel injection amount input through the ECU 10 after an operation input to start route guidance had been performed through the operation part 30 may be the travel distance and the consumed fuel amount from the departing point of the vehicle. After starting the calculation of the fuel consumption at SB1, the fuel consumption determination part 61a repeats the calculation of the fuel consumption at predetermined intervals (for example, at 10-second intervals) and stores the calculated result as back-up in the RAM.

Subsequently, the display control part 61b starts the route guidance from the departing point to the destination (5B2). Route search from the departing point to the destination and the route guidance based on the searched result are not specifically explained because known route search methods and route guidance methods can be utilized.

Next, the fuel consumption determination part 61a determines whether cancellation conditions for canceling the provisional registration processing are met (SB3). The cancellation conditions include, for example, a case in which a destination has been rearranged by an operation input through the operation part 30 and the final destination has been changed, a case in which an operation input for canceling the route guidance has been performed through the operation part 30, a case in which the final destination has been deleted by an operation input through the operation part 30, a case in which information inputs such as the vehicle pulse signal, the fuel injection amount, and the like from the ECU 10 has been terminated, a case in which the power of the navigation system 1 has been turned off, and the like.

As a result, if the cancellation conditions are met (SB3: YES), the fuel consumption determination part 61a discards the calculated result of the fuel consumption that has been stored as a back-up in the RAM (SB4), terminates the provisional registration processing, and returns to a main routine.

On the other hand, if the cancellation conditions are not met (SB3: NO), the fuel consumption determination part 61a determines whether the vehicle has arrived at the destination set at SA1 of FIG. 3 (SB5). The fuel consumption determination part 61a determines that the vehicle has arrived at the destination, for example, if there are no branches between the current position of the vehicle determined by the current position detection processing part 20 and the destination, the distance from the current position to the destination is a predetermined distance (for example, 300 m) or less, and the vehicle speed calculated from the vehicle speed pulse signals is a predetermined vehicle speed (for example, 5 km/h) or less. Or, it may be determined that the vehicle has arrived at the destination if the distance from the current position to the destination is a predetermined distance or less, regardless of the vehicle speed.

As a result, if the vehicle has not arrived at the destination yet (SB5: NO), the fuel consumption determination part 61a returns to SB3 and re-determines whether the cancellation conditions for canceling the provisional registration processing are met (SB3).

On the other hand, if the vehicle has arrived at the destination (SB5: YES), the fuel consumption determination part 61a terminates the calculation of the fuel consumption during the travel of the vehicle (SB6), and determines the calculated result that is stored as back-up in the RAM as the fuel consumption in the travel of the vehicle from the current departing point to destination (SB7). In addition, the fuel consumption determination part 61a determines the travel distance used for the last calculation of the fuel consumption as the travel distance of the vehicle from starting the departing point to arriving at the destination, and also determines using a timer (not shown) or the like a travel time from when the destination was set at SA1 of FIG. 3 till when it was determined at SB5 of FIG. 4 that the vehicle has arrived at the destination.

Subsequently, the fuel consumption determination part 61a provisionally-registers various kinds of information regarding the current travel such as the fuel consumption determined at SB7, the current departing point and destination, the travel distance, and the travel time in the fuel consumption DB 62b (SB8). Specifically, the fuel consumption determination part 61a stores the information corresponding to the items "departing point", "destination", "previous", and "final updated date" in association with the "provisional registration" that is previously stored corresponding to the item "route name" in the fuel consumption DB 62b shown in FIG. 2. That is, the fuel consumption determination part 61a stores, corresponding to the item "departing point", the point information (the name "around Okazaki-shi, Hane-cho, Aza, Kitono", the coordinate "N34. 55. 48, E137. 9. 36 in FIG. 2) that identifies the current departing point, and stores, corresponding to the item "destination", the point information (the name "Nagoya station", the coordinate "N35. 10. 15, E136. 52. 50" in FIG. 2) that identifies the destination set at SA1 of FIG. 3. In addition, the fuel consumption determination part 61a stores, corresponding to the sub-item "fuel consumption" of the item "previous", the fuel consumption determined at SB7 (17.5 km/L in FIG. 2), stores, corresponding to the sub-item "travel time" of the item "previous", the travel time determined at SB7 ("62 min." in FIG. 2), stores, corresponding to the sub-item "travel distance" of the item "previous", the travel distance determined at SB7 ("45.6 km" in FIG. 2), and further stores, corresponding to the item "final updated date", the present date ("2010/6/23" in FIG. 2). If the information corresponding to the items "departing point", "destination", "previous", and "final updated date" is stored in association with the "provisional registration" that is previously stored corresponding to the item "route name" of the fuel consumption DB 62b, the information is over-written. By limiting the information to be provisionally-registered to the information of the latest travel in such manner, the increase of a recording capacity that is required of the data recording part 62 can be suppressed while the information useful for the current user is maintained.

With reference to FIG. 4, after having performed the provisional registration for the fuel consumption DB 62b at SB8, the fuel consumption determination part 61a terminates the provisional registration processing and returns to the main routine.

(Processing—Display Control Processing)

Figure 5:
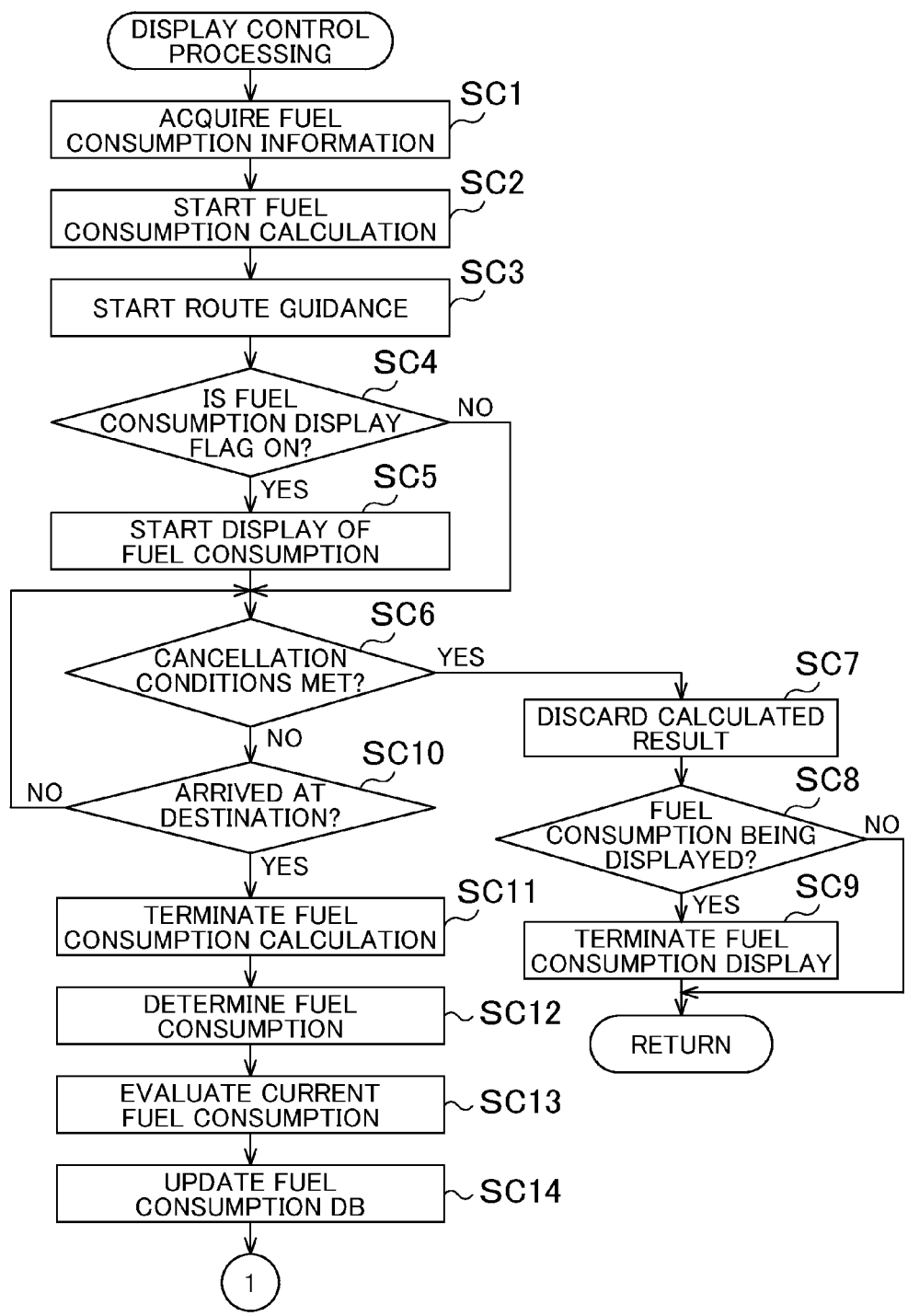
FIG. 5 is a flow chart of display control processing.
Figure 6:
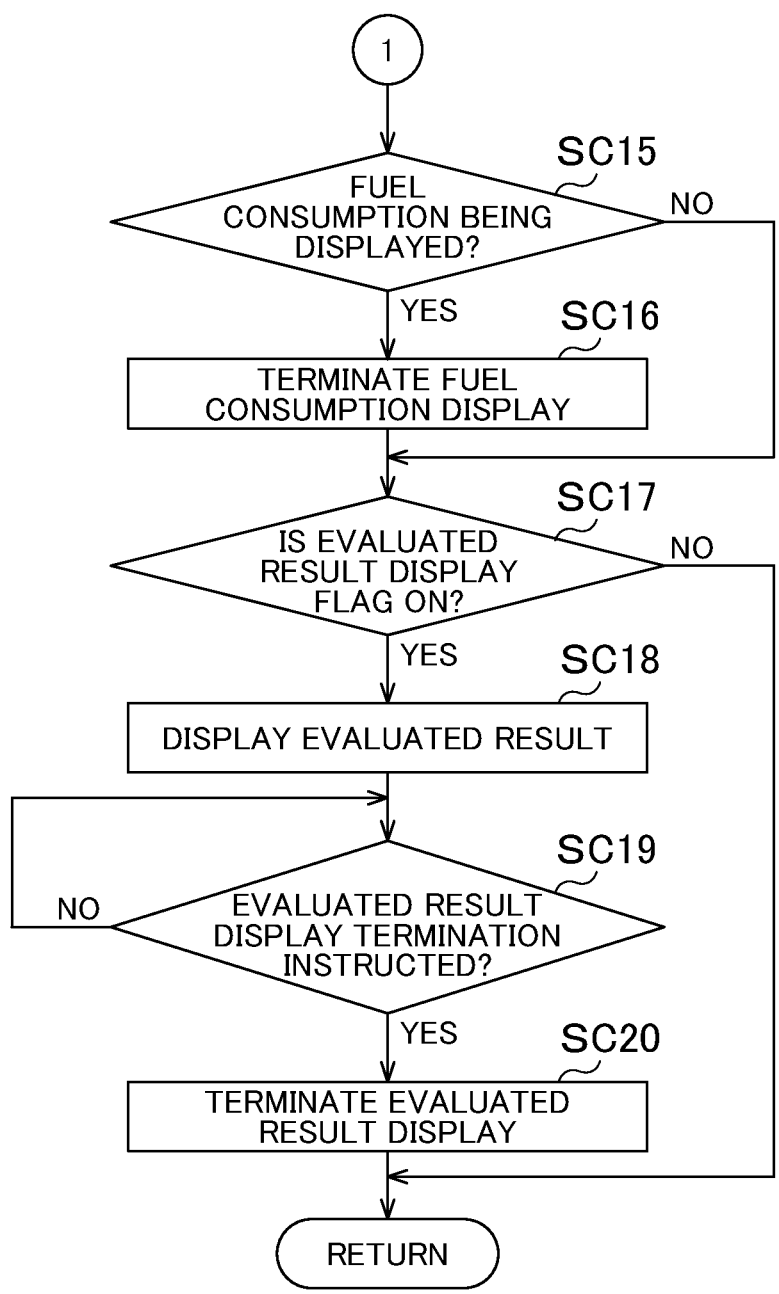
FIG. 6 is a flow chart of display control processing subsequent to FIG. 5.

The display control processing is the processing for performing display control of the fuel consumption. FIGS. 5 and 6 are flow charts of the display control processing. When the display control processing starts, the display control part 61b acquires, from the fuel consumption DB 62b, previous fuel consumption information identifying the fuel consumption in the previous travel, best fuel consumption information identifying the most efficient fuel consumption, and average fuel consumption information identifying an average fuel consumption in the past travel among the fuel consumption information associated with the point information corresponding to the departing point and the current travel destination (SC1). Also, the display control part 61b acquires the name of the travel route from the departing point to the current travel destination. That is, the display control part 61b acquires the fuel consumption information that is stored corresponding to the items "route name", "previous", "best", and "average fuel consumption" from the fuel consumption DB 62b. For example, if it is determined at SA3 of FIG. 3 that the current departing point and destination are identical to the coordinates of the departing point and the destination of the route name "home-company" in the fuel consumption DB 62b shown in FIG. 2, the display control part 61b acquires "home-company" as the route name, "15.5 km/L" as the previous fuel consumption information, "19.5 km/L" as the best fuel consumption information, and "10.0 km/L" as the average fuel consumption information.

In addition, if there is a plurality of sets of the coordinates of the departing point and the destination, which have been determined as being identical to the current departing point and destination, stored in the fuel consumption DB 62b, the display control part 61b acquires from the fuel consumption DB 62b the fuel consumption information stored corresponding to the items "previous", "best", and "average fuel consumption" that are associated with a set of coordinates having the smallest total value of the distance between the coordinate of the current departing point and the coordinate of the departing point stored in the fuel consumption DB 62b and the distance between the coordinate of the current destination and the coordinate of the destination stored in the fuel consumption DB 62b. If there is a plurality of sets of the coordinates having the same total value of the distance between the coordinate of the current departing point and the coordinate of the departing point stored in the fuel consumption DB 62b and the distance between the coordinate of the current destination and the coordinate of the destination stored in the fuel consumption DB 62b, the display control part 61b acquires from the fuel consumption DB 62b the fuel consumption information stored corresponding to the items "previous", "best", and "average fuel consumption" that are associated with a set of coordinates having the smallest distance between the coordinate of the current destination and the coordinate of the destination stored in the fuel consumption DB 62b. Further, if there is a plurality of sets of the coordinates having the same distance between the coordinate of the current destination and the coordinate of the destination stored in the fuel consumption DB 62b, the display control part 61b selects, in the following order, a set of coordinates of which the number stored corresponding to the item "updated number" in the fuel consumption DB 62b is the largest, a set of coordinates of which the date stored corresponding to the item "final updated date" is the latest, a set of coordinates listed at the upper line (on the upper side in FIG. 2) in the fuel consumption DB 62b, and acquires from the fuel consumption DB 62b the fuel consumption information stored corresponding to the items "previous, "best", and "average fuel consumption" that are associated with the selected sets of coordinates.

With reference to FIG. 5, the fuel consumption determination part 61a starts the calculation of the fuel consumption in the travel of the vehicle (SC2). The calculation of the fuel consumption is not specifically explained because it is the same as SB1 of FIG. 4.

Subsequently, the display control part 61b starts the route guidance from the departing point to the destination (SC3).

Next, the display control part 61b determines whether a fuel consumption display flag for displaying the fuel consumption on the display 40 is ON (SC4). The fuel consumption display flag is recorded for example in the RAM, and switched between ON and OFF based on an operation input through the operation part 30.

Figure 7A:
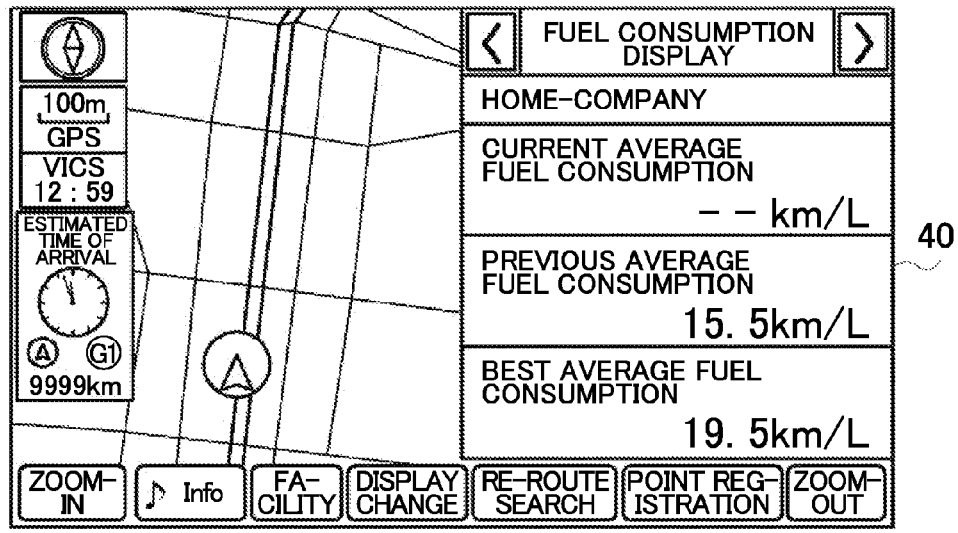
FIG. 7 illustrates a display in which a fuel consumption in a previous travel, a most efficient fuel consumption, and a fuel consumption in a current travel are displayed.
Figure 7B:
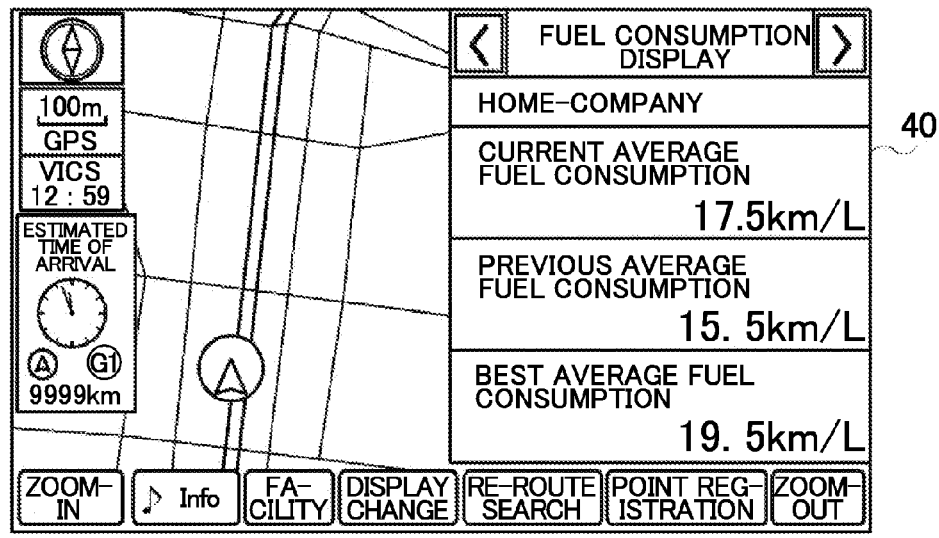

As a result, if the fuel consumption display flag is ON (SC4: YES), the display control part 61b starts the display of the fuel consumption during the previous travel based on the previous fuel consumption information acquired at SC1, the most efficient fuel consumption based on the best fuel consumption information acquired at SC1, and the fuel consumption during the current travel determined by the fuel consumption determination part 61a on the display 40 (SC5). FIGS. 7A and 7B illustrates the display 40 in which the fuel consumption during the previous travel, the most efficient fuel consumption, and the fuel consumption during the current travel are displayed. FIG. 7A illustrates the display 40 until the first fuel consumption is calculated after the calculation of the fuel consumption has started at SC2. FIG. 7B illustrates the display 40 after the first fuel consumption has been calculated. As shown in FIGS. 7A and 7B, the display control part 61*b* for example divides a display screen of the display 40 into 2 pieces and displays the map on one side (on the left side in FIGS. 7A and 7B) and the fuel consumption on the other side (on the right side in FIGS. 7A and 7B). In the fuel consumption display screen, the name of the travel route, ("home-company" in FIGS. 7A and 7B), the previous fuel consumption information ("previous average fuel consumption 15.5 km/L" in FIGS. 7A and 7B), the best fuel consumption information ("best average fuel consumption 19.5 km/L" in FIGS. 7A and 7B), which have been acquired by the display control part 61*b*, are displayed, and also the calculated result of the fuel consumption that have been calculated by the fuel consumption determination part 61*a* after SC2 and stored as back-up in the RAM is displayed as the fuel consumption during the current travel ("current average fuel consumption 17.5 km/L" in FIG. 7B). During the period from when the calculation of the fuel consumption has started at SC2 till when the first fuel consumption is calculated, the fuel consumption during the current travel is not displayed on the display 40 because the calculated result of the fuel consumption by the fuel consumption determination part 61*a* is not stored in the RAM ("current average fuel consumption—km/L" in FIG. 7A). In addition, after the fuel consumption determination part 61*a* has started the calculation of the fuel consumption at SC2, the fuel consumption determination part 61*a* repeats the calculation of the fuel consumption at predetermined intervals (for example, at 10-second intervals). Each time the fuel consumption determination part 61*a* stores the calculated result as back-up in the RAM, the display control part 61*b* updates the fuel consumption during the current travel displayed on the display 40 with the calculated result of the fuel consumption that has been newly stored as back-up in the RAM.

With reference to FIG. 5, if the fuel consumption display flag is OFF (SC4: NO), or after the processing at SC5, the display control part 61*b* determines whether cancellation conditions for canceling the display control processing are met (SC6). The cancellation conditions include for example a case in which a final destination has been newly set by an operation input through the operation part 30, a case in which a destination has been rearranged by an operation input through the operation part 30 and the final destination has been changed, a case in which an operation input for canceling the route guidance has been performed through the operation part 30, a case in which the final destination has been deleted by an operation input through the operation part 30, a case in which an operation input for not displaying the fuel consumption on the display 40 has been performed through the operation part 30, a case in which information inputs such as the vehicle pulse signal, the fuel injection amount, and the like from the ECU 10 has been terminated, a case in which the power of the navigation system 1 has been turned off, and the like.

Figure 8:
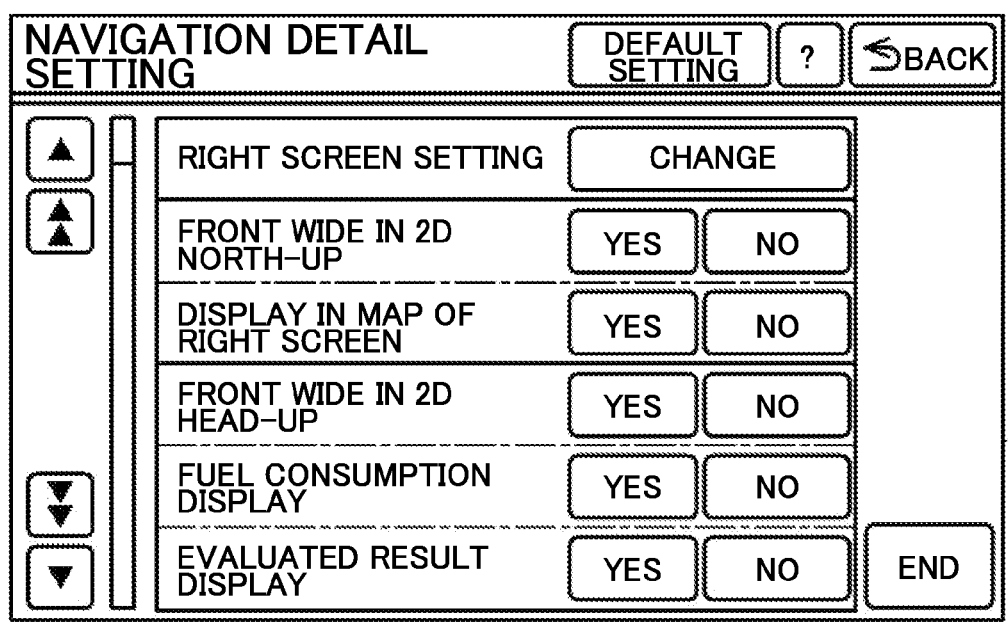
FIG. 8 illustrates a setting screen for setting whether to display the fuel consumption on a display.

FIG. 8 illustrates a setting screen for setting whether to display the fuel consumption on the display 40. For example, in the setting screen of FIG. 8, if a setting button "NO" corresponding to a "fuel consumption display" has been selected through the operation part 30, the display control part 61*b* recognizes that the operation input for not displaying the fuel consumption on the display 40 has been performed through the operation part 30, and determines that the cancellation conditions for canceling the display control processing have been met.

Figure 9A:
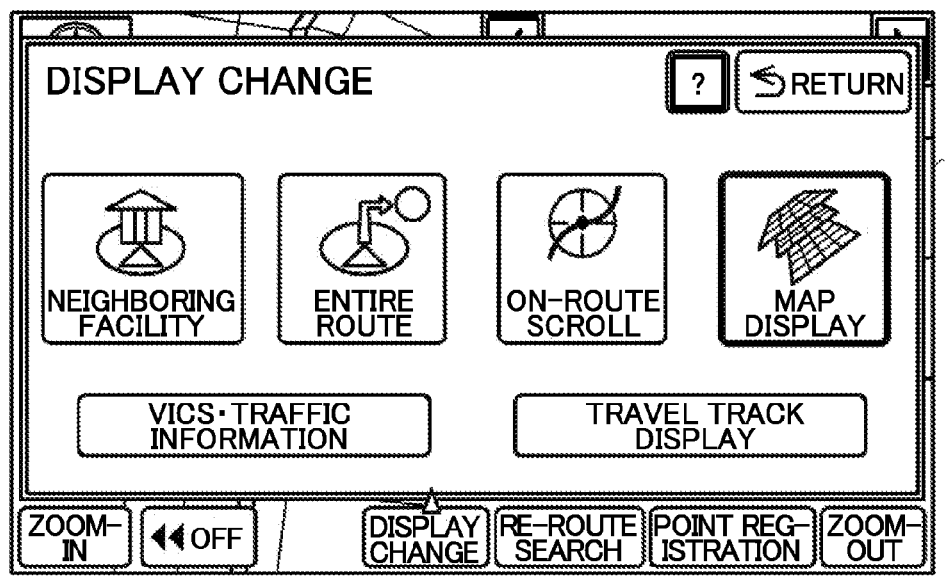
FIG. 9 illustrates a setting screen for receiving a setting not to display the fuel consumption on the display.
Figure 9B:
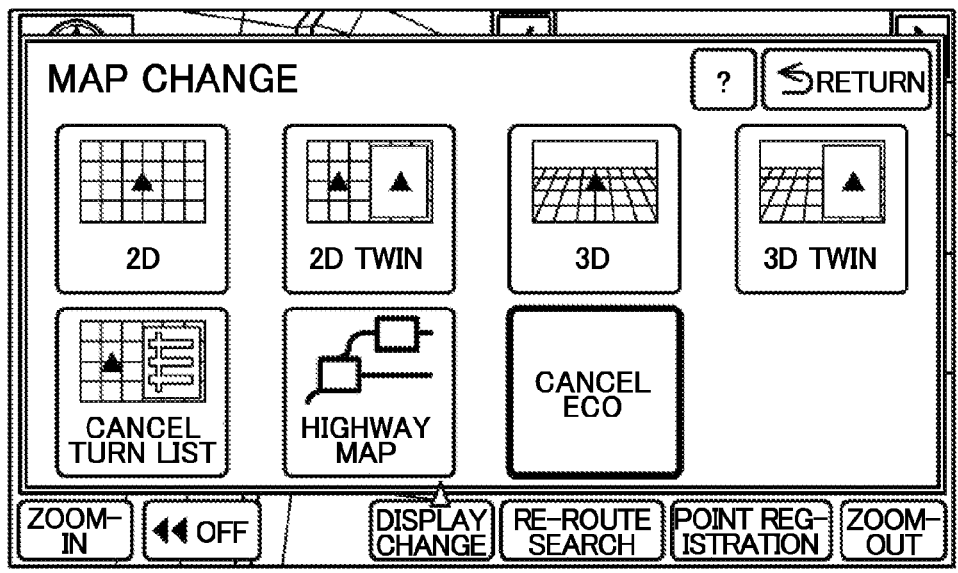

FIGS. 9A and 9B illustrate a setting screen for receiving a setting for not displaying the fuel consumption on the display 40. When the map and the fuel consumption are displayed on the display 40 as shown in FIGS. 7A and 7B, if a setting button "display change" on the lower side of the screen has been selected through the operation part 30, the display control part 61*b* displays, on the display 40, a setting screen for performing a setting relating to the display change of the display 40, as shown in FIG. 9A. In the setting screen shown in FIG. 9A, if a setting button "map display" for performing a setting relating to a map display has been selected through the operation part 30, the display control part 61*b* displays, on the display 40, a setting screen for performing a setting of the map display, as shown in FIG. 9B. In the setting screen shown in FIG. 9B, if a setting button "cancel eco" for performing a setting for not displaying the information regarding the fuel consumption on the display 40 has been selected through the operation part 30, the display control part 61*b* recognizes that the operation input for not displaying the fuel consumption on the display 40 has been performed through the operation part 30, and determines that the cancellation conditions for canceling the display control processing have been met.

With reference to FIG. 5, if the display control part 61*b* determines at SC6 that the cancellation conditions for canceling the display control processing have been met (SC6: YES), the fuel consumption determination part 61*a* discards the calculated result of the fuel consumption stored as back-up in the RAM (SC7).

In addition, the display control part 61*b* determines whether the fuel consumption during the previous travel based on the previous fuel consumption information acquired at SC1, the most efficient fuel consumption based on the best fuel consumption information acquired at SC1, the fuel consumption during the current travel determined by the fuel consumption determination part 61*a* are being displayed on the display 40 (SC8). That is, the display control part 61*b* determines whether a fuel consumption display part is displaying the fuel consumption display screen as shown in FIGS. 7A and 7B on the display 40.

As a result, if the fuel consumption during the previous travel, the most efficient fuel consumption, the fuel consumption during the current travel are being displayed on the display 40 (if the fuel consumption display screen is being displayed on the display 40) (SC8: YES), the display control part 61*b* terminates the display of the fuel consumption (SC9). For example, the display control part 61*b* does not display the fuel consumption as shown in FIGS. 7A and 7B and displays only the map in one screen on the display 40.

If the display control part 61*b* determines at SC8 that the fuel consumption during the previous travel, the most efficient fuel consumption, and the fuel consumption during the current travel are not being displayed on the display 40 (if the fuel consumption display screen is not being displayed on the display 40) (SC8: NO), or after the processing at SC9, the display control part 61*b* terminates the display control processing and returns to the main routine.

On the other hand, the cancellation conditions are not met at SC6 (SC6: NO), the fuel consumption determination part 61*a* determines whether the vehicle has arrived at the destination set at SA1 of FIG. 3 (SC10). The determination method about whether the vehicle has arrived at the destination is not specifically explained because it is the same as SB5 of FIG. 4.

As a result, if the vehicle has not arrived at the destination (SC10: NO), the fuel consumption determination part 61a returns to SC6 and determines whether the cancellation conditions for canceling the display control processing have been met (SC6).

On the other hand, if the vehicle has arrived at the destination (SC10: YES), the fuel consumption determination part 61a terminates the calculation of the fuel consumption during the travel of the vehicle (SC11) and determines the calculated result that was last stored as back-up in the RAM as the fuel consumption in the travel of the vehicle from the current departing point to destination (SC12). In addition, the fuel consumption determination part 61a determines the travel distance last used for the calculation of the fuel consumption as the travel distance of the vehicle from starting the departing point to arriving at the destination, and also determines using a timer (not shown), or the like, a travel time from when the destination was set at SA1 of FIG. 3 till when it was determined at SC10 of FIG. 5 that the vehicle has arrived at the destination.

Subsequently, the display control part 61b performs an evaluation of the fuel consumption during the current travel on the basis of a comparison among the fuel consumption during the previous travel based on the previous fuel consumption information acquired at SC1, the most efficient fuel consumption based on the best fuel consumption information, the average fuel consumption based on the average fuel consumption information, and the fuel consumption during the current travel determined by the fuel consumption determination part 61a at SC12 (SC13). For example, the display control part 61b evaluates the fuel consumption during the current travel on a four-point level; the highest level "Level 3" is assigned in a case in which the fuel consumption during the current travel exceeds the most efficient fuel consumption, the second highest level "Level 2" in a case in which the fuel consumption during the current travel is equal to or less than the most efficient fuel consumption but exceeds the fuel consumption during the previous travel and the average fuel consumption, the third highest level "Level 1" in a case in which the fuel consumption during the current travel is equal to or more than the average fuel consumption but does not exceed the fuel consumption during the previous travel. The display control part 61b evaluates a case in which any of the above-mentioned levels does not apply to the fuel consumption in the current travel as the lowest level "No level applicable".

Subsequently, the fuel consumption determination part 61a updates the fuel consumption DB 62b based on various information regarding the current travel such as the fuel consumption, the current departing point and destination, the travel distance, the travel time, which are determined at SC12 (SC14). Specifically, the fuel consumption determination part 61a updates the information stored corresponding to the items "previous", "best", "average fuel consumption", "final updated date", and "updated number" in association with the coordinates of the departing point and the destination determined at SA3 of FIG. 3 as being identical to the current departing point and destination. That is, the display control part 61b overwrites the sub-item "fuel consumption" of the item "previous" by the fuel consumption determined at SC12, the sub-item "travel time" of the item "previous" by the travel time determined at SC12, and the sub-item "travel distance" of the item "previous" by the travel distance determined at SC12. In addition, if the evaluated result at SC13 is "Level 3", the display control part 61b overwrites the sub-item "fuel consumption" of the item "best" by the fuel consumption determined at SC12, the sub-item "travel time" of the item "best" by the travel time determined at SC12, the sub-item "travel distance" of the item "best" by the travel distance determined at SC12, respectively. The display control part 61b calculates the average fuel consumption during the past travel by dividing a total travel distance of the vehicle from the departing point to the destination identical to the current ones by a total consumed fuel amount, and overwrites the item "average fuel consumption" by the calculated average fuel consumption. The total travel distance and the total consumed fuel amount of the vehicle is calculated by the fuel consumption determination part 61a for example based on the number of vehicle speed pulses and the fuel injection amount that are input through the ECU 10, and recorded for each combination of the departing point and the destination in the RAM or the data recording part 62. Further, the display control part 61b overwrites the item "final updated date" by the current date. In addition, the display control part 61b increases a value stored corresponding to the item "updated number" by one and overwrites the item by the increased value.

In FIG. 6, the display control part 61b determines whether the fuel consumption during the previous travel based on the previous fuel consumption information acquired at SC1, the most efficient fuel consumption based on the best fuel consumption information acquired at SC1, and the fuel consumption during the current travel determined by the fuel consumption determination part 61a are being displayed on the display 40 (SC15). That is, the display control part 61b determines whether the fuel consumption display part is displaying the fuel consumption display screen as shown in FIGS. 7A and 7B on the display 40.

As a result, if the fuel consumption during the previous travel, the most efficient fuel consumption, and the fuel consumption during the current travel are displayed on the display 40 (if the fuel consumption display screen is being displayed on the display 40) (SC15: YES), the display control part 61b terminates the display of the fuel consumption (SC16). For example, the display control part 61b does not display the fuel consumption as shown in FIGS. 7A and 7B and displays only the map in one screen on the display 40.

If the display control part 61b determines at SC15 that the fuel consumption during the previous travel, the most efficient fuel consumption, the fuel consumption in the current travel are not being displayed on the display 40 (if the fuel consumption display screen is not being displayed on the display 40) (SC15: NO), or after the processing at SC16, the display control part 61b determines whether an evaluated result display flag for displaying the evaluated result of the fuel consumption during the current travel on the display 40 is ON (SC17). The evaluated result display flag is recorded for example in the RAM, and switched between ON and OFF based on an operation input through the operation part 30. For example, if the setting button "no" corresponding to an "evaluated result display" has been selected through the operation part 30 in the setting screen of FIG. 8, or if a setting button "cancel eco" for performing a setting for not displaying the information regarding the fuel consumption on the display 40 has been selected through the operation part 30 in the setting screen as shown in FIG. 9B, the display control part 61b recognizes that the operation input for not displaying the evaluated result of the fuel consumption on the display 40 has been performed through the operation part 30, and sets the evaluated result display flag OFF.

As a result, if the evaluated result display flag is ON (SC17: YES), the display control part 61b displays on the display 40 the evaluated result of the fuel consumption during the current travel acquired at SC13 (SC 18). FIGS. 10A and 10B illustrates the display 40 in which the evaluated result of the fuel consumption during the current travel is displayed. As shown in FIG. 10A, the display control part 61b displays the route name corresponding to the departing point and the current travel destination ("home-company" in FIG. 10A), the fuel consumption during the current travel determined at SC12 ("current record 17.5 km/L" in FIG. 10A), the fuel consumption during the previous travel based on the previous fuel consumption information acquired at SC1 ("previous record 15.5 km/L" in FIG. 10A), and the most efficient fuel consumption based on the best fuel consumption information acquired at SC1 ("best record 19.5 km/L" in FIG. 10A), and the display based on the evaluated result at SC13 ("best record updated" that corresponds to the highest level "Level 3" in FIG. 10A) on the display 40.

Further, if a button "information" for displaying the information regarding the current travel and the past travel has been selected through the operation part 30 in an evaluated result display screen shown in FIG. 10A, the display control part 61b displays an information display screen as shown in FIG. 10B on the display 40. In the information display screen, the display control part 61b displays the fuel consumption during the current travel determined at SC12 ("current average fuel consumption 17.5 km/L" in FIG. 10B), the travel time ("travel time 12 min." in FIG. 10B), and the travel distance "travel distance 16.2 km" in FIG. 10B) on the display 40, and also displays the various kinds of information stored in the fuel consumption DB 62b in association with the coordinates corresponding to the departing point and the current travel destination on the display 40 (the route name; the name of the departing point; the name of the destination; the updated number; the fuel consumption, the travel time, and the travel distance during the previous travel; the fuel consumption, the travel time, and the travel distance when traveled in the most efficient fuel consumption; and the average fuel consumption).

Back to FIG. 6, the display control part 61b waits until a command for terminating the display of the evaluated result is given through the operation part 30 (SC19: NO). If a command input for terminating the display of the evaluated result has been given through the operation part 30 (SC19: YES), the display control part 61b terminates the display of the evaluated result on the display 40 (SC20). For example, if a button "close" has been selected through the operation part 30 in FIG. 10A, or if a switch "current position" (not shown) has been pressed, the display control part 61b closes the evaluated result display screen shown in FIGS. 10A and 10B and displays the map in one screen on the display 40.

At SC17, if the evaluated result display flag is OFF (SC17: NO), or after the processing at SC20, the display control part 61b terminates the display control processing and returns to the main routine.

(Processing—Formal Registration Processing)

Next, formal registration processing for formally-registering the fuel consumption information that was provisionally-registered in the fuel consumption DB 62b in the above-mentioned provisional registration processing is explained. FIG. 11 is a flow chart of the formal registration processing. The formal registration processing starts if the setting screen for performing various kinds of setting regarding the fuel consumption DB 62b has been called based on a command input through the operation part 30, for example. FIGS. 12 and 13 illustrate a screen to be displayed on the display 40 when formally-registering the fuel consumption information that was provisionally-registered in the fuel consumption DB 62b.

When the formal registration processing starts, the display control part 61b waits until a command input for instructing the display of the information that is provisionally-registered in the fuel consumption DB 62b is given through the operation part 30 (SD1: NO). FIG. 12A illustrates a setting screen for performing various kinds of settings regarding the fuel consumption DB 62b. For example, if a button "formal registration" has been selected through the operation part 30 in the setting screen in FIG. 12A, the display control part 61b determines that a command input for instructing the display of the information that is provisionally-registered in the fuel consumption DB 62b has been given.

With reference to FIG. 11, if the command input for instructing the display of the information that is provisionally-registered in the fuel consumption DB 62b has been given through the operation part 30 (SD1: YES), the display control part 61b acquires from the fuel consumption DB 62b the information (the provisionally-registered fuel consumption information) stored corresponding to the items "departing point", "destination", "previous", and "final updated date" in association with "provisional registration" stored corresponding to the item "route name" in the fuel consumption DB 62b, and displays the information on the display 40 (SD2). FIG. 12B illustrates the provisionally-registered fuel consumption information displayed on the display 40.

With reference to FIG. 11, after the processing at SD2, the display control part 61b determines whether a command input for formally-registering the provisionally-registered fuel consumption information in the fuel consumption DB 62b has been given through the operation part 30 (SD3). For example, if a button "yes" for instructing the formal registration of the provisionally-registered fuel consumption information in the fuel consumption DB 62b has been selected through the operation part 30 in the screen in FIG. 12B, the display control part 61b determines that the command input for formally-registering the provisionally-registered fuel consumption information in the fuel consumption DB 62b has been given (SD3: YES). In addition, if a button "no" for not instructing the formal registration of the provisionally-registered fuel consumption information in the fuel consumption DB 62b has been selected through the operation part 30, or if a certain period of time has passed without any command input being given through the operation part 30, the display control part 61b determines that the command input for instructing the formal registration of the provisionally-registered fuel consumption information in the fuel consumption DB 62b has not been given (SD3: NO).

As a result, if the command input for instructing the formal registration of the provisionally-registered fuel consumption information in the fuel consumption DB 62b has not been given (SD3: NO), the display control part 61b displays the setting screen shown in FIG. 12A again and returns to SD1.

On the other hand, if the command input for instructing the formal registration of the provisionally-registered fuel consumption information in the fuel consumption DB 62b has been given (SD3: YES), the display control part 61b displays on the display 40 an input screen for inputting the name of the travel route from the departing point to the destination that is provisionally-registered, and accepts an input of a name of the travel route through the operation part 30 (SD4). FIG. 13 illustrates the input screen for inputting a name of the travel route from the departing point to the destination that is provisionally-registered, showing a case in which "home-company" was input as the name of the travel route. The name of the travel route may be the name of the destination that is provisionally-registered ("Nagoya station" in the example of FIG. 12B).

Subsequently, the display control part 61b formally-registers the provisionally-registered fuel consumption information acquired at SD2 and the name of the travel route for which the input through the operation part 30 was accepted at SD4 in the fuel consumption DB 62b (SD5). Specifically, the display control part 61b newly stores, corresponding to the item "route name" in the fuel consumption DB 62b, the information identifying the name of the travel route for which the input through the operation part 30 was accepted at SD4, and further stores, corresponding to the items "departing point", "destination", "previous", and "final updated date", the provisionally-registered fuel consumption information in association with the information identifying the name of the travel route. Further, the display control part 61b stores, corresponding to the item "best", the information that is provisionally-registered corresponding to the item "previous" among the provisionally-registered fuel consumption information. In addition, the display control part 61b stores, corresponding to the item "average fuel consumption", the information that is provisionally-registered corresponding to the sub-item "fuel consumption" of the item "previous" among the provisionally-registered fuel consumption information. The information to be newly formally-registered in the fuel consumption DB 62b at SD5 is added below the information that is already formally-registered in the fuel consumption DB 62b (the second line from the bottom in the fuel consumption DB 62b in FIG. 2).

After having performed the formal registration at SD 5, the display control part 61b terminates the formal registration processing.

Figure 14A:
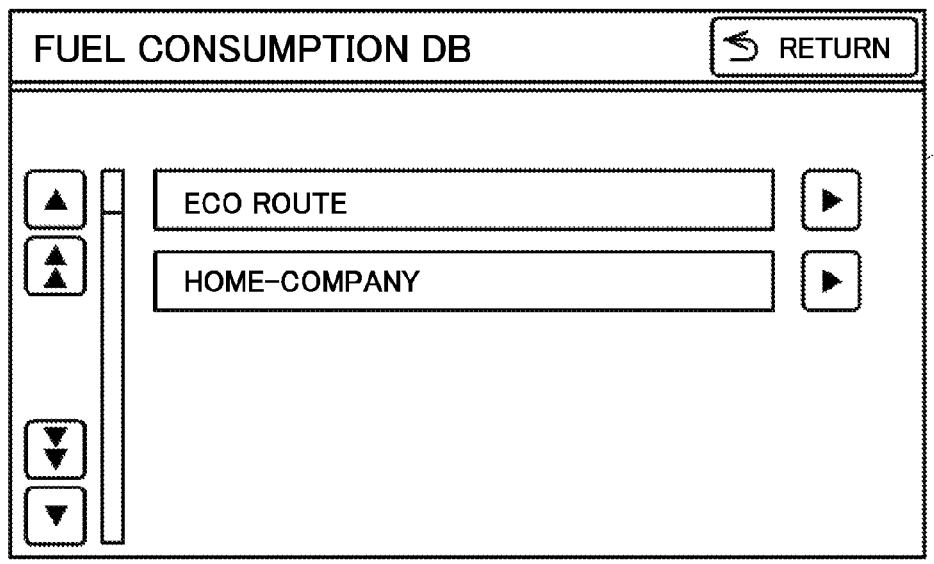
FIG. 14 illustrates a screen to be displayed on the display when editing information that was formally-registered in the fuel consumption DB.
Figure 14B:
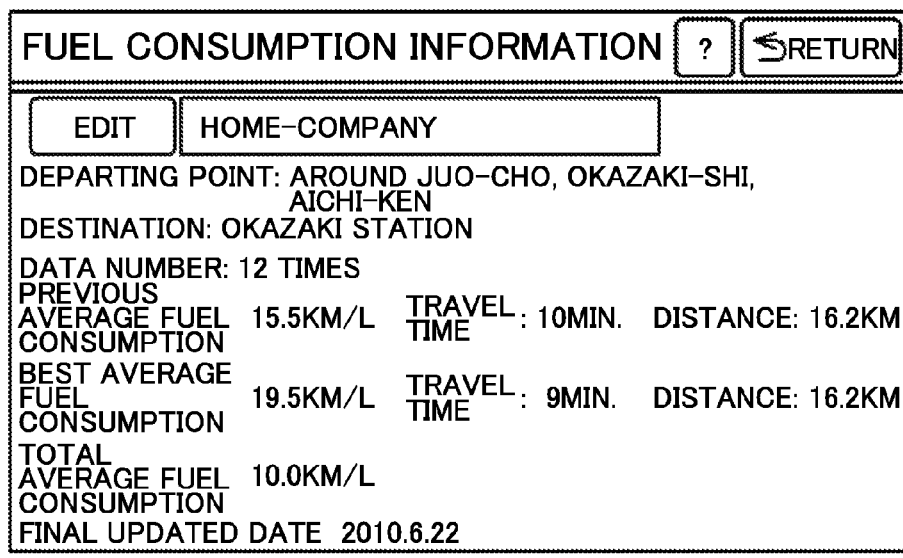
Figure 16A:
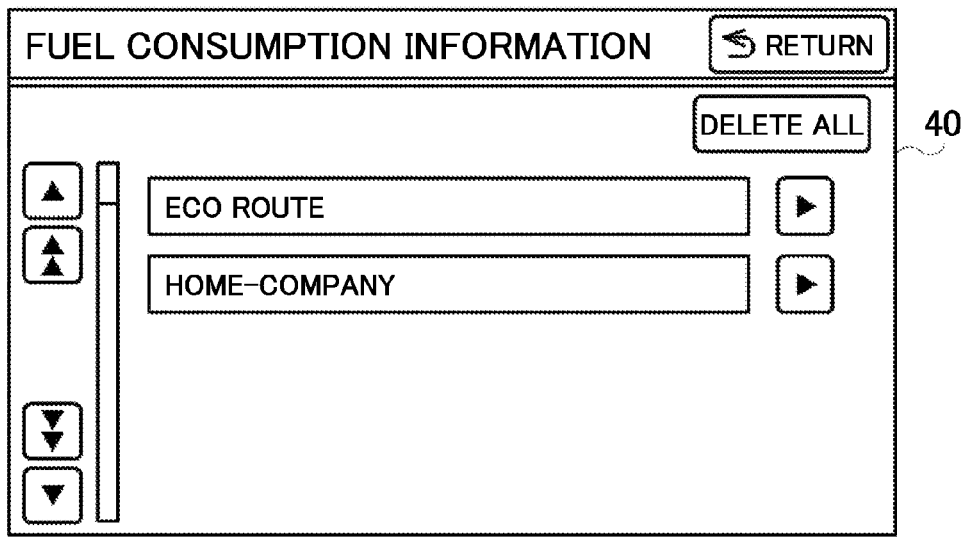
FIG. 16 illustrates a screen to be displayed on the display when deleting information that was formally-registered in the fuel consumption DB.
Figure 16B:
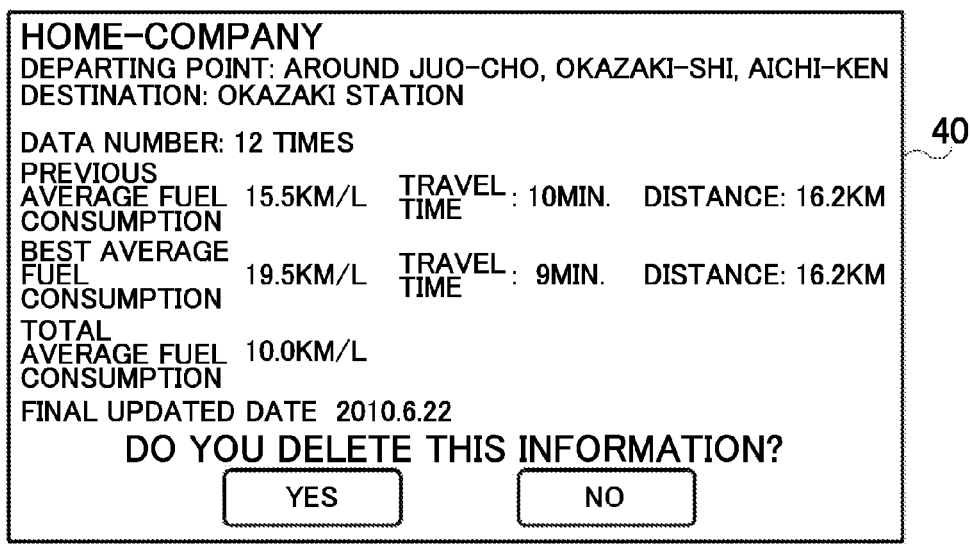

The information formally-registered in the fuel consumption DB 62b can be edited or deleted any time based on an operation input through the operation part 30. FIGS. 14A, 14B and 15 illustrate a screen to be displayed on the display 40 when editing the information formally-registered in the fuel consumption DB 62b. FIGS. 16A and 16B illustrate a screen to be displayed on the display 40 when deleting the information formally-registered in the fuel consumption DB 62b.

If a button "information" has been selected through the operation part 30 in the setting screen in FIG. 12A, the display control part 61b determines that a command input for instructing the edit of the information formally-registered in the fuel consumption DB 62b has been given. Then, the display control part 61b displays a screen for accepting a selection of the information subject to edit on the display 40. FIG. 14A illustrates a screen for accepting a selection of the information subject to edit. As shown in FIG. 14A, the display control part 61b displays for example the information formally-registered corresponding to the item "route name" in the fuel consumption DB 62b on the display 40.

If a button "home-company" among the buttons showing the route names has been selected through the operation part 30 in the screen in FIG. 14A, the display control part 61b displays on the display 40 the respective information that is stored in association with "home-company" in the item "route name" in the fuel consumption DB 62b. FIG. 14B illustrates a screen in which the information stored in the fuel consumption DB 62b is displayed.

Further, if a button "edit" for instructing a change of the route name has been selected through the operation part 30 in the screen in FIG. 14B, the display control part 61b determines that a command input for changing the route name has been given. Then, the display control part 61b displays on the display 40 a change screen for changing the name of the travel route stored in the fuel consumption DB 62b and accepts a change input of the name of the travel route through the operation part 30. FIG. 15 illustrates an input screen for performing a change input of the name of the travel route, showing a case in which the name of the travel route was changed to "frequently-traveled route".

In addition, if a button "delete" has been selected through the operation part 30 in the setting screen in FIG. 12A, the display control part 61b determines that a command input for instructing a deletion of the information formally-registered in the fuel consumption DB 62b has been given. Then, the display control part 61b displays on the display 40 a screen for accepting a selection of the information subject to deletion. FIG. 16A illustrates a screen for accepting a selection of the information subject to deletion. As shown in FIG. 16A, the display control part 61b displays on the display 40 for example the information formally-registered corresponding to the item "route name" in the fuel consumption DB 62b.

If a button "home-company" among the buttons showing the route names has been selected through the operation part 30 in the screen in FIG. 16A, the display control part 61b displays on the display 40 the respective information that is stored in association with "home-company" in the item "route name" in the fuel consumption DB 62b. FIG. 16B illustrates a screen in which the information stored in the fuel consumption DB 62b is displayed.

If a button "YES" for instructing a deletion of the information displayed in the screen from the fuel consumption DB 62b has been selected through the operation part 30 in the screen in FIG. 16B, the display control part 61b determines that a command input for instructing a deletion of the information formally-registered in the fuel consumption DB 62b has been given. Then, the display control part 61b deletes the information displayed in the screen in FIG. 16B from the fuel consumption DB 62b.

(Effects)

According to the first embodiment, the display of the fuel consumption in the previous travel based on the previous fuel consumption information and the fuel consumption in the current travel determined by the fuel consumption determination part 61a is controlled. Therefore, for example, it is possible to provide guidance that enables the user to compare the fuel consumption during the current travel with the fuel consumption during the previous travel. In particular, in a case where it is impossible during the current travel to exceed the best fuel consumption achieved in the past because of numerous favorable conditions (for example, the warm-up operation is seasonally unnecessary, no congestion is occurring, a few stops at intersections, the air pressure of tires is appropriate, a few passengers are in the vehicle, the headlight and/or the air conditioner are not used, and the like) that are different from the conditions during the current travel, displaying the best fuel consumption is less likely to motivate the user to conduct fuel-efficient driving. However, displaying the fuel consumption during the current travel together with the fuel consumption during the previous travel, which is similar in travel conditions to the current travel, makes it possible to provide the user with a target achievable during the current travel. Thereby, it is possible to provide guidance that could further motivate the user to conduct fuel-efficient driving. It is possible to store the fuel consumption information for each travel condition such as seasons, time zones, weather, or the like in the fuel consumption DB 62b, acquire the fuel consumption information corresponding to the current travel conditions from the fuel consumption DB 62b, and display the fuel consumption under the travel conditions similar to those in the current travel. However, in order to store the fuel consumption information for each travel condition in such manner, a recording capacity of the fuel consumption DB 62*b* needs to be increased. On the other hand, according to the first embodiment, by displaying the fuel consumption during the previous travel, it is possible to easily provide the user with the fuel consumption under the travel conditions similar to those during the current travel, whereby making it possible to provide the guidance that could further motivate the user to conduct fuel efficient driving without increasing the recording capacity of the fuel consumption DB 62*b*. Further, the fuel consumption during the previous travel that is likely to be similar in conditions to the current travel is displayed together with the fuel consumption during the current travel. Therefore, the information especially useful for the current user can be provided.

In addition, the display of the most efficient fuel consumption is controlled based on the best fuel consumption information that is associated with the point information corresponding to the departing point and the current travel destination of the vehicle. Therefore, it is possible to provide the guidance that enables the user to compare the fuel consumption during the current travel with the most efficient fuel consumption in the past while driving, for example. Thereby, it becomes possible to provide the guidance that could motivate the user to conduct further fuel-efficient driving, for example, such that the best record of the fuel consumption could be broken during the current travel.

In addition, after the vehicle has arrived at the destination, the display of the evaluated result of the fuel consumption during the current travel is controlled on the basis of the comparison among the fuel consumption during the previous travel based on the previous fuel consumption information, the most efficient fuel consumption based on the best fuel consumption information, the fuel consumption during the current travel determined by the fuel consumption determination part 61*a*. Therefore, if the fuel consumption during the current travel has exceeded the most efficient fuel consumption in the past, by assigning a higher level to the driving of the user for example, it becomes possible to provide the guidance that could motivate the user to conduct further fuel-efficient driving in the future.

In addition, the display of the average fuel consumption is controlled on the basis of the average fuel consumption information that is associated with the point information corresponding to the departing point and the destination of the vehicle in the current travel. Therefore, for example, it becomes possible to provide the guidance that enables the user to compare the fuel consumption in the current travel with the average fuel consumption in the past while driving. Thereby, it becomes possible to provide the guidance that could motivate the user to conduct further fuel-efficient driving, for example, such that the fuel consumption during the current travel would not fall below at least the average fuel consumption during the past in the current travel.

In addition, after the vehicle has arrived at the destination, the display of the evaluated result of the fuel consumption during the current travel is controlled based on the comparison among the fuel consumption during the previous travel based on the previous fuel consumption information, the average fuel consumption based on the average fuel consumption information, the fuel consumption during the current travel determined by the fuel consumption determination part 61*a*. Therefore, if the fuel consumption during the current travel has fallen below the average fuel consumption in the past, for example, by assigning a lower level toward the driving of the user, it is possible to provide the guidance that could motivate the user to conduct further fuel-efficient driving in the future.

[Second Embodiment]

Next, a second embodiment is explained. In the second embodiment, the previous fuel consumption information associated with travel route information corresponding to an attribute of a current travel route of the vehicle is acquired from the fuel consumption information storage unit, and a display of the fuel consumption during the previous travel based on the acquired previous fuel consumption information and the fuel consumption during the current travel determined by the fuel consumption determination unit is controlled. The configuration of the second embodiment is almost the same as that of the first embodiment if not otherwise specified. Regarding the part of the configuration that is almost the same as the first embodiment, the same symbols and/or names as used in the first embodiment are assigned but not explained specifically.

(Processing—Navigation Processing)

Figure 17:
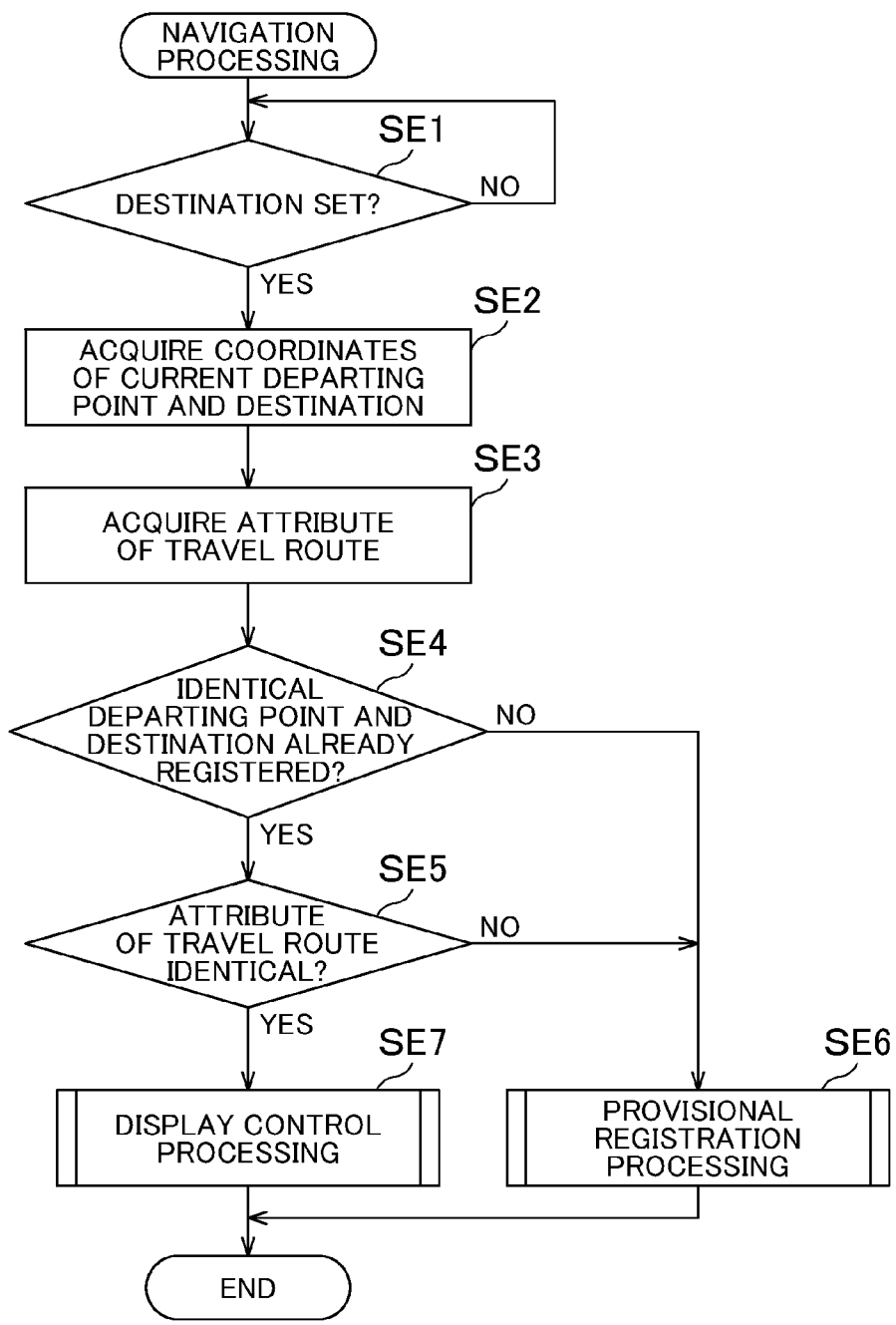
FIG. 17 is a flow chart of navigation processing according to a second embodiment.

First, the navigation processing to be executed by the navigation system 1 according to the second embodiment is explained. FIG. 17 is a flow chart of the navigation processing according to the second embodiment. Among the navigation processing according to the second embodiment, SE1 and SE2 are the same as SA1 and SA2 of FIG. 3, SE4 is the same as SA3, and SE6 and SE7 are the same as SA4 and SA5, respectively. Therefore, those processing is not explained specifically.

After the processing at SE2, the display control part 61*b* acquires the travel route information identifying the attribute of the travel route from the departing point to the destination of the vehicle in the current travel (SE3). Specifically, the display control part 61*b* acquires as the travel route information the travel distance from the departing point to the current travel destination. The travel distance is acquired for example by the controller 61 through a search for the travel route from the departing point to the current travel destination in a known route search method.

If the display control part 61*b* determines at SE4 that the departing point and the destination that are identical to the current departing point and destination are already registered in the fuel consumption DB 62*b* (SE4: YES), the display control part 61*b* determines whether the attribute of the travel route from the departing point to the current travel destination is identical to the attribute of the travel route from the departing point to the destination already registered in the fuel consumption DB 62*b* (SE5). As mentioned above, if the display control part 61*b* acquires the travel distance from the departing point to the current travel destination as the travel route information at SE3, the display control part 61*b* determines whether the difference between the travel distance stored in the fuel consumption DB 62*b* in association with the point information corresponding to the departing point and the destination that are identical to the current departing point and destination and the travel distance acquired at SE3 is equal to or less than a predetermined threshold value (for example, 300 m). If the travel route from the departing point to the destination is different due to the difference in the base conditions of the travel route search, and as a result, the difference between the travel distance from the departing point to the current travel destination and the travel distance stored in the fuel consumption DB 62*b* in association with the point information corresponding to the departing point and the destination identical to the current departing point and destination exceeds the predetermined threshold, the display control part 61*b* determines that the attribute of the travel route from the departing point to the current travel destination is not identical to the attribute of the travel route from the departing point to the destination already registered in the fuel consumption DB 62b (SE5: NO). The case in which the travel route from the departing point to the destination is different due to the difference in the base conditions of the travel route search includes for example, a case in which the search conditions (a recommended route, a distance priority, a general road priority, and the like) of the travel route from the departing point to the current travel destination are different from the search conditions of the travel route from the departing point to the destination already registered in the fuel consumption DB 62b, a case in which the congestion situation during the current travel is different from the congestion situation in the travel from the departing point to the destination already registered in the fuel consumption DB 62b, and the like.

As a result, the display control part 61b determines that the attribute of the travel route from the departing point to the current travel destination is not identical to the attribute of the travel route from the departing point to the destination already registered in the fuel consumption DB 62b (SE5: NO), the display control part 61b executes the provisional registration processing (SE6).

On the other hand, the display control part 61b determines that the attribute of the travel route from the departing point to the current travel destination is identical to the attribute of the travel route from the departing point to the destination already registered in the fuel consumption DB 62b (SE5: YES), the display control part 61b executes the display control processing (SE7).

(Processing—Display Control Processing)

Next, the display control processing to be executed by the navigation system 1 according to the second embodiment is explained. The respective processing of the display control processing according to the second embodiment is the same as the respective processing of the display control processing according to the first embodiment except the processing at SC1 of FIG. 5. Therefore, the illustration and explanation of the flowchart is not given.

When the display control processing starts, the display control part 61b acquires, among the fuel consumption information that is associated with the point information corresponding to the departure point and the current travel destination and associated with the travel route information corresponding to the attribute of the travel route from the departing point to the current travel destination, the previous fuel consumption information identifying the fuel consumption during the previous travel, the best fuel consumption information identifying the most efficient fuel consumption, and the average fuel consumption information identifying an average fuel consumption during the past travel (SC1). Here, "the travel route information corresponding to the attribute of the travel route from the departing point to the current travel destination" is the travel route information indicating the attribute of the travel route determined at SE5 of FIG. 17 to be identical to the attribute of the travel route from the departing point to the current travel destination among the attributes of the travel routes already registered in the fuel consumption DB 62b. That is, for example, if it is determined at SE4 of FIG. 17 that the current departing point and destination are identical to the coordinates of the departing point and the destination of the route name "home-company" in the fuel consumption DB 62b shown in FIG. 2, and if the travel distance from the departing point to the current travel destination acquired at SE3 of FIG. 17 is 16.2 km (or, equal to the travel distance already registered in association with the route name "home-company" in the fuel consumption DB 62b), the display control part 61b acquires "home-company" as the route name, "15.5 km/L" as the previous fuel consumption information, "19.5 km/L" as the best fuel consumption information, and "10.0 km/L" as the average fuel consumption information.

(Effect)

According to the second embodiment, the previous fuel consumption information associated with the travel route information corresponding to the attribute of the current travel route of the vehicle is acquired from the fuel consumption DB 62b, and the display of the fuel consumption in the previous travel based on the acquired previous fuel consumption information and the fuel consumption during the current travel determined by the fuel consumption determination part 61a is controlled. Therefore, it is possible to acquire the fuel consumption information appropriate as a target for comparison with the fuel consumption during the current travel of the vehicle and control the display. Thereby, it is possible to provide information useful for the user.

(Modifications of the Embodiment)

The respective embodiments of the present invention were explained above. However, the specific configuration and units for implementing the present invention may be modified and improved in any manner or form within the scope of the technical ideas of the present invention as set forth in the claims thereof. Examples of such modifications are explained below.

(Problems to Be Solved by the Invention and Effects of the Invention)

The problems to be solved by the present invention and the effects of the present invention are not limited to the content described above and may vary depending on the environment in which the present invention is practiced and the detailed configuration thereof. The above problems may be only partially solved, and the above effects only partially achieved.

(Division and Integration)

The electronic constituent elements described above are merely functional concepts, and need not be physically configured as illustrated in the drawings. That is, the specific form of division or integration of each portion is not limited to that shown in the drawings. The constituent elements, as a whole or in part, can be divided or integrated in any manner either functionally or physically based on various types of loads or use conditions. For example, the fuel consumption DB 62b in the navigation device 60 may be provided in a center device connected in a manner communicable with the navigation devices 60 through a network. The fuel consumption DB 62b may store the fuel consumption information transmitted from a plurality of navigation devices 60. In such a case, the fuel consumption DB 62b stores vehicle type information identifying a type of the vehicle mounted with each of the navigation devices 60, in addition to the information as the one in the fuel consumption DB 62b illustrated in FIG. 2. At SC1 of the display control processing in FIG. 5, the display control part 61b may acquire, from the fuel consumption DB 62b, the fuel consumption information that is associated with the point information corresponding to the departing point and the current travel destination and associated with the vehicle type information corresponding to the type of the host vehicle. Thereby, even if the fuel consumption information of the host vehicle is not registered yet, it is possible to display the fuel consumption of other vehicles that have driven under the same conditions as the host vehicle and provide the information useful for the user.

(Fuel Consumption Information)

Figure 18B:
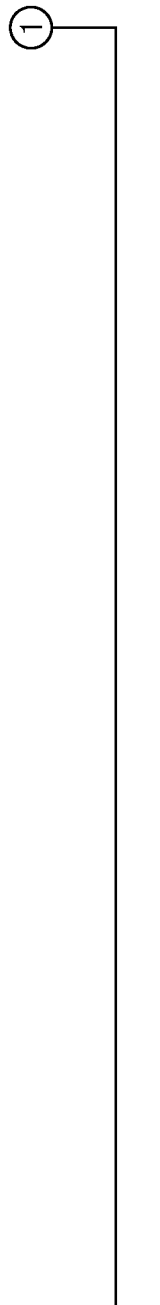
FIG. 18 is a table illustrating information stored in the fuel consumption DB according to a modification of the embodiment.

In the respective embodiments mentioned above, the fuel consumption information identifying the fuel consumption from the departing point to the destination in the past travel is stored in the fuel consumption DB 62b; however, different information may be stored in the fuel consumption DB 62b. For example, in addition to the information same as the information stored in the fuel consumption DB 62b explained in the respective embodiments mentioned above, the point information identifying one or more waypoints between the departing point and the destination (the information stored corresponding to an item "waypoint" in FIG. 18) and the sectional fuel consumption information identifying the fuel consumption in the past travel for each of a plurality of sections forming the travel route from the departing point to the destination, the sections being sectioned by the respective waypoints (the information stored corresponding to a sub-item "section fuel consumption" of the item "previous" in FIG. 18) may be stored in the fuel consumption DB62b.

In such a case, at SC1 of the display control processing shown in FIG. 5, the display control part 61b acquires the previous fuel consumption information identifying the fuel consumption in the previous travel, the best fuel consumption information identifying the most efficient fuel consumption, the average fuel consumption information identifying the average fuel consumption in the past travel, and the sectional fuel consumption information identifying the fuel consumption in the past travel for each of a plurality sections forming the travel route from the departing point to the destination, the sections being sectioned by the respective waypoints, among the fuel consumption information associated with the point information corresponding to the departing point and the current travel destination of the vehicle from the fuel consumption DB 62b.

If the fuel consumption display flag is ON at SC4 of FIG. 5 (SC4: YES), the display control part 61b starts the display of the fuel consumption in the previous travel based on the previous fuel consumption information acquired at SC1, the most efficient fuel consumption based on the best fuel consumption information acquired at SC1, the fuel consumption for each section based on the sectional fuel consumption information acquired at SC1, and the fuel consumption in the current travel determined by the fuel consumption determination part 61a on the display 40 (SC5). Regarding the fuel consumption for each section based on the sectional fuel consumption information acquired at SC1, only the fuel consumption of the section including the current position of the vehicle that is identified through the current position detection processing part 20 may be displayed.

Thereby, it is possible to display the current fuel consumption and the previous fuel consumption for each of the sections being sectioned by the respective waypoints in such a manner that the fuel consumption can be compared. Therefore, it becomes possible to provide the guidance that could motivate the user to conduct further fuel-efficient driving, for example, such that the fuel consumption in the current travel could exceed that in the previous travel in each section.

In the respective embodiments mentioned above, the average fuel consumption information identifying the average fuel consumption for each combination of the departing point and the destination is stored in the fuel consumption DB 62b. However, the average fuel consumption information identifying a total average fuel consumption for all past travels (for example, the average fuel consumption from when starting the use of the vehicle till the present time) may be stored in the fuel consumption DB 62b. In such a case, after the calculation of the fuel consumption has been started at SB1 of the provisional registration processing in FIG. 4 or at SC2 of the display control processing in FIG. 5, the fuel consumption determination part 61a may calculate the total average fuel consumption each time the fuel consumption is calculated at predetermined intervals and store it in the fuel consumption DB 62b. For example, the fuel consumption determination part 61a calculates a total travel distance and the total consumed fuel amount of the vehicle from when starting the use of the vehicle till a time point of the calculation and divide the calculated total distance by the total consumed fuel amount to calculate the total average fuel consumption.

For each combination of the departing point and the destination, the fuel consumption from the departing point to the destination in each travel in the past may be stored as the average fuel consumption information in the fuel consumption DB 62b. In such a case, for example, at SC1 of FIG. 5, the display control part 61b acquires from the fuel consumption DB 62b the fuel consumption in each travel in the past from the departing point to the destination that are identical to the current travel, calculates an average value of the acquired fuel consumptions as the average fuel consumption in the past travel from the departing point to the destination, and display the calculated average fuel consumption on the display 40 at SC18 of FIG. 6 for example.

(Provisional Registration Processing)

In the respective embodiments mentioned above, a case in which there is one piece of information to be provisionally-registered in the fuel consumption DB 62b was explained. However, a plurality of pieces of information may be provisionally-registered in the fuel consumption DB 62b. In such a case, in the formal registration processing, the information to be subject to the formal registration may be selected from the provisionally-registered information based on a command input through the operation part 30.

(Formal Registration Processing)

In the respective embodiments mentioned above, if a command input for instructing the formal registration of the provisionally-registered fuel consumption information has been performed through the operation part 30 in the formal registration processing, the display control part 61b formally-registers the provisionally-registered fuel consumption information in the fuel consumption DB 62b. However, the information may be formally-registered automatically independently of the command input through the operation part 30. For example, if the data amount of the fuel consumption DB 62b is less than the capacity assigned to the fuel consumption DB 62b in the data recording part 62, the display control part 61b may formally-register the provisionally-registered fuel consumption information in the fuel consumption DB 62b.

Or, an upper limit to the number of pieces of information that can be formally-registered in the fuel consumption DB 62b may be set (for example, 20 pieces of information). In such a case, in the formal registration processing, if the limit number of information is already formally-registered in the fuel consumption DB 62b, the display control part 61b displays on the display 40 a message indicating that the provisionally-registered fuel consumption information cannot be formally-registered unless the formally-registered information is selected and deleted.

(Navigation Processing)

In the above-mentioned second embodiment, at SE3 of the navigation processing shown in FIG. 17, the display control part 61b acquires the travel distance from the departing point to the current travel destination as the travel route information. However, the information serving as a reference for determining whether the travel route searched for the same departing point and destination is identical, such as the search conditions (for example, "recommended", "distance priority", "general road priority", and the like) when searching for a travel route from the departing point to the current travel destination, the congestion situation in each travel, and the like, may be acquired as the travel route information. The search conditions when searching for a travel route can be acquired based on an operation input through the operation part 30 for example. In such a case, in the fuel consumption DB 62b, in addition to the information as the one in the fuel consumption DB 62b illustrated in FIG. 2, the travel route information identifying the search conditions when searching for the travel route from the departing point to the destination is stored.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation device comprising:
a fuel consumption determination unit that is configured to determine a fuel consumption in a travel of a vehicle;
a fuel consumption information storage unit that is configured to store point information identifying a departing point and a destination in a travel of a vehicle and fuel consumption information identifying the fuel consumption in a past travel from the departing point to the destination such that the point information and the fuel consumption information is mutually associated;
a display control unit that is configured to acquire previous fuel consumption information identifying the fuel consumption in a previous travel among the fuel consumption information associated with the point information corresponding to the departing point and the destination in a current travel of the vehicle from the fuel consumption information storage unit, and control a display of the fuel consumption in the previous travel based on the acquired previous fuel consumption information and the fuel consumption in the current travel determined by the fuel consumption determination unit,
wherein, the display control unit is configured such that in response to the display control unit determining that a plurality of sets of coordinates of the departing point and the destination, which are within a predetermined distance from the coordinates of the current departing point and the current destination, respectively, is stored in the fuel consumption information storage unit, the display control unit is configured to acquire the previous fuel consumption information associated with the set of coordinates having the smallest total value of the distance between the coordinate of the current departing point and the coordinate of the departing point stored in the fuel consumption information storage unit and the distance between the coordinate of the current destination and the coordinate of the destination stored in the fuel consumption information storage unit.

2. The navigation device according to claim 1, wherein the display control unit is configured such that in response to the display control unit determining that a plurality of sets of coordinates having the same total value of the distance between the coordinate of the current departing point and the coordinate of the departing point stored in the fuel consumption information storage unit and the distance between the coordinate of the current destination and the coordinate of the destination stored in the fuel consumption information storage unit, the display control unit is configured to acquire the previous fuel consumption information associated with the set of coordinates having the smallest distance between the coordinate of the current destination and the coordinate of the destination stored in the fuel consumption information storage unit.

3. The navigation device according to claim 2, wherein the display control unit is configured such that in response to the display control unit determining that a plurality of sets of coordinates having the same distance between the coordinate of the current destination and the coordinate of the destination stored in the fuel consumption information storage unit, the display control unit is configured to select, in the following order, the set of coordinates for which a number of updates stored in the fuel consumption information storage unit is the largest, the set of coordinates for which a date of a final update is the latest, and a set of coordinates listed at an upper line in the fuel consumption information storage unit, and acquire the previous fuel consumption information associated with the selected set of coordinates.

4. The navigation device according to claim 1, wherein the display control unit is configured to acquire average fuel consumption information identifying an average fuel consumption in the past travel among the fuel consumption information associated with the point information corresponding to the departing point and the destination in the current travel destination of the vehicle from the fuel consumption information storage unit, and control a display of the average fuel consumption based on the acquired average fuel consumption information; and the display control unit, after the vehicle has arrived at the destination, is configured to control a display of an evaluated result of the fuel consumption in the current travel on the basis of a comparison among the fuel consumption in the previous travel based on the acquired previous fuel consumption information, the average fuel consumption based on the acquired average fuel consumption information, and the fuel consumption in the current travel determined by the fuel consumption determination unit.

5. The navigation device according to claim 4, wherein the fuel consumption information storage unit further is configured to store travel route information identifying an attribute of a travel route from the departing point to the destination, and the display control unit is configured to acquire the previous fuel consumption information associated with the travel route information corresponding to the attribute of a current travel route of the vehicle from the fuel consumption information storage unit, and controls a display of the fuel consumption in the previous travel based on the acquired previous fuel consumption information and the fuel consumption in the current travel determined by the fuel consumption determination unit.

6. The navigation device according to claim 1, wherein the attribute of the travel route from the departing point to the destination includes at least one of a travel distance from the departing point to the destination, search conditions when searching for a travel route from the departing point to the destination, and the congestion situation during travel from the departing point to the destination.

7. A navigation method comprising the steps of:
determining, by a conroller, a fuel consumption in a travel of a vehicle;
storing, in a recording unit, point information identifying a departing point and a destination during a travel of a vehicle and fuel consumption information including identifying the fuel consumption in a past travel from the departing point to the destination such that the point information and the fuel consumption information is mutually associated;

determining, by the controller, that a plurality of sets of coordinates of the departing point and the destination, which are within a predetermined distance from the coordinates of a current departing point and a current destination in a current travel of the vehicle, respectively, is stored in the recording unit;

acquiring, by the controller, previous fuel consumption information identifying the fuel consumption in a previous travel among the fuel consumption information associated with the set of coordinates having the smallest total value of the distance between the coordinate of the current departing point and the coordinate of the departing point stored in the recording unit and the distance between the coordinate of the current destination and the coordinate of the destination stored in the recording unit, and controlling a display of the fuel consumption in the previous travel based on the acquired previous fuel consumption information and the fuel consumption in the current travel determined at the fuel consumption determination step.

8. A navigation program stored in a non-transitory computer readable medium causing a computer to execute a method comprising the steps of:

determining, by a controller, a fuel consumption in a travel of a vehicle;

storing, in a recording unit, point information identifying a departing point and a destination during a travel of a vehicle and fuel consumption information including identifying the fuel consumption in a past travel from the departing point to the destination such that the point information and the fuel consumption information is mutually associated;

determining, by the controller, that a plurality of sets of coordinates of the departing point and the destination, which are within a predetermined distance from the coordinates of a current departing point and a current destination in a current travel of the vehicle, respectively, is stored in the recording unit;

acquiring by the controller, previous fuel consumption information identifying the fuel consumption in a previous travel among the fuel consumption information associated with the set of coordinates having the smallest total value of the distance between the coordinate of the current departing point and the coordinate of the departing point stored in the recording unit and the distance between the coordinate of the current destination and the coordinate of the destination stored in the recording unit (SC1), and controlling a display of the fuel consumption in the previous travel based on the acquired previous fuel consumption information and the fuel consumption in the current travel determined at the fuel consumption determination step.

* * * * *